Figure 4A:
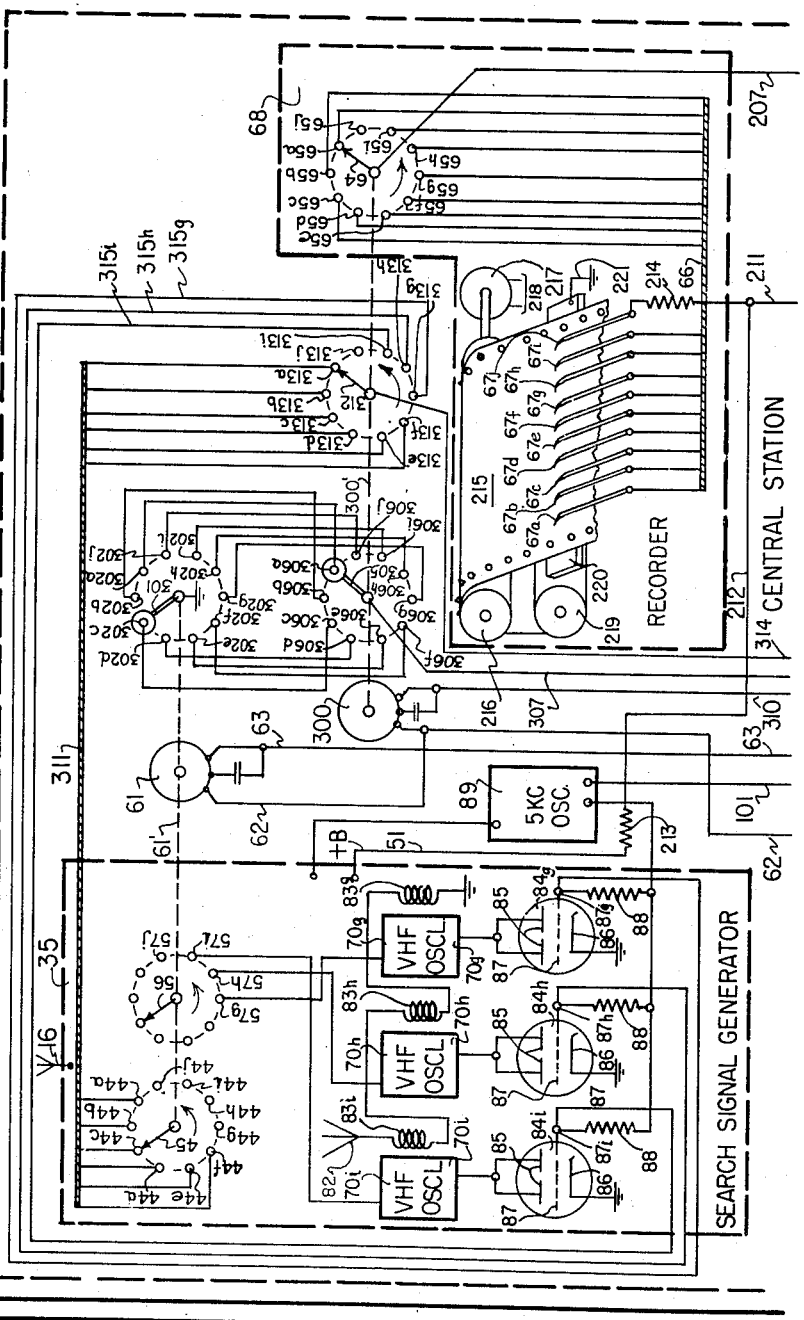

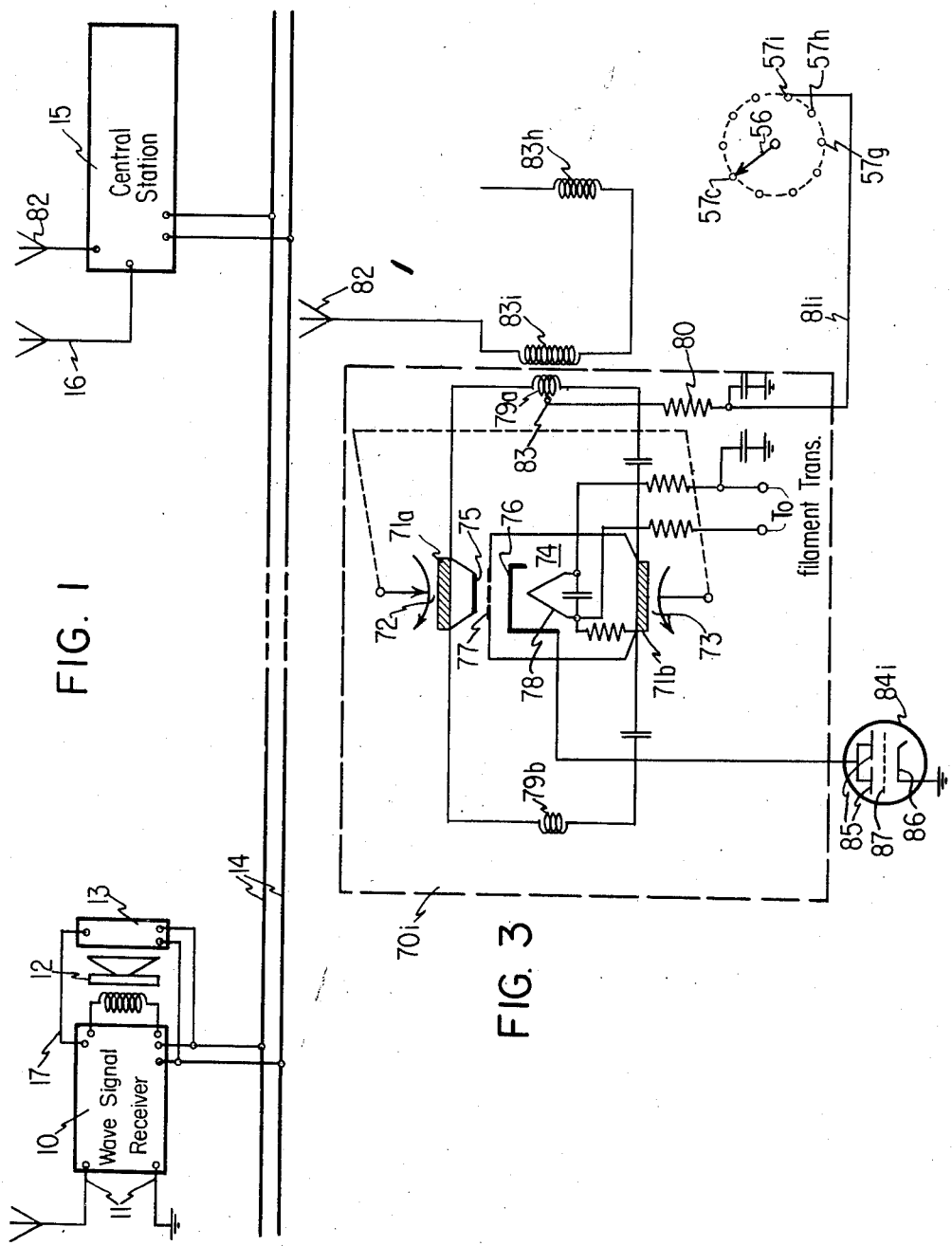

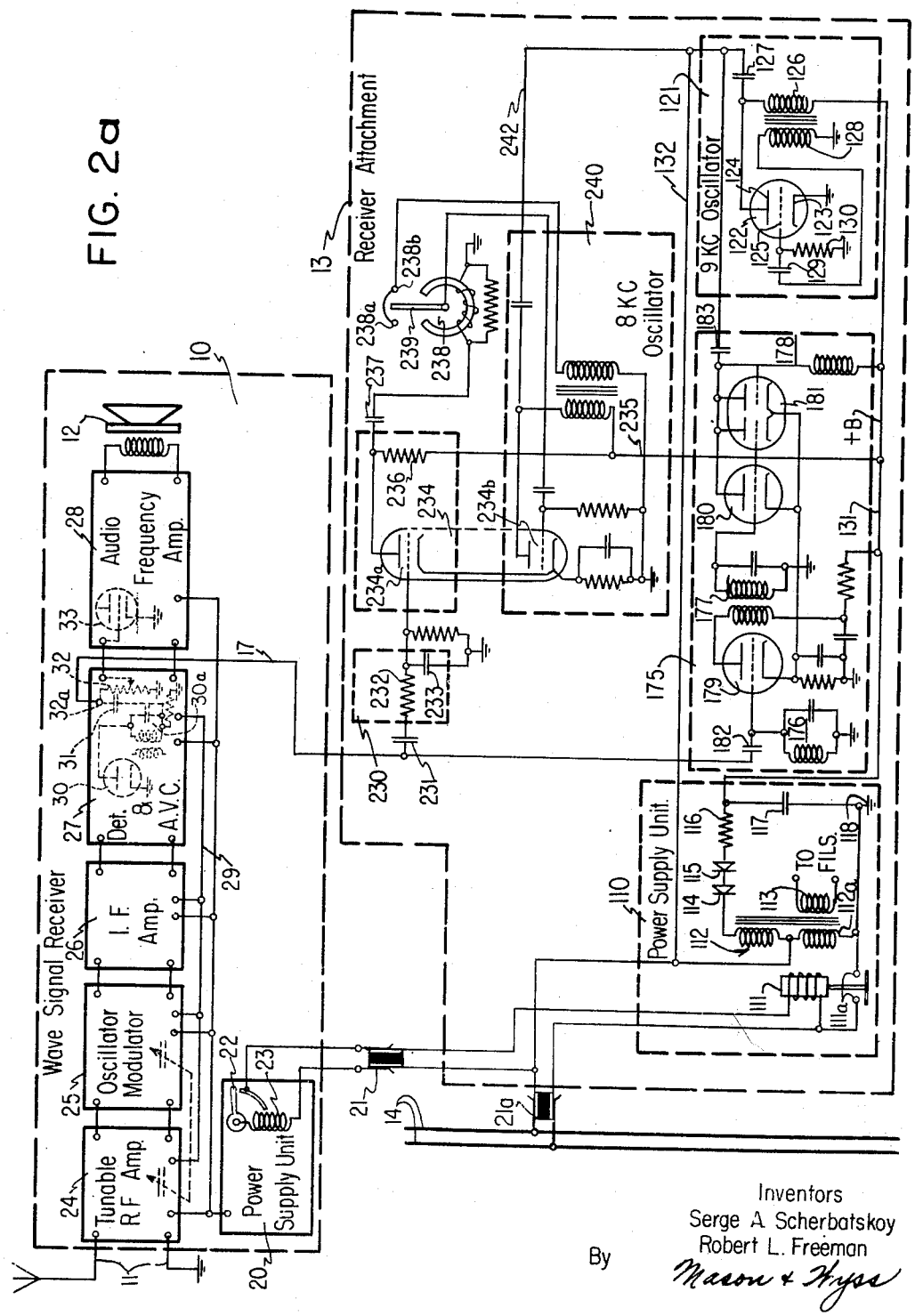

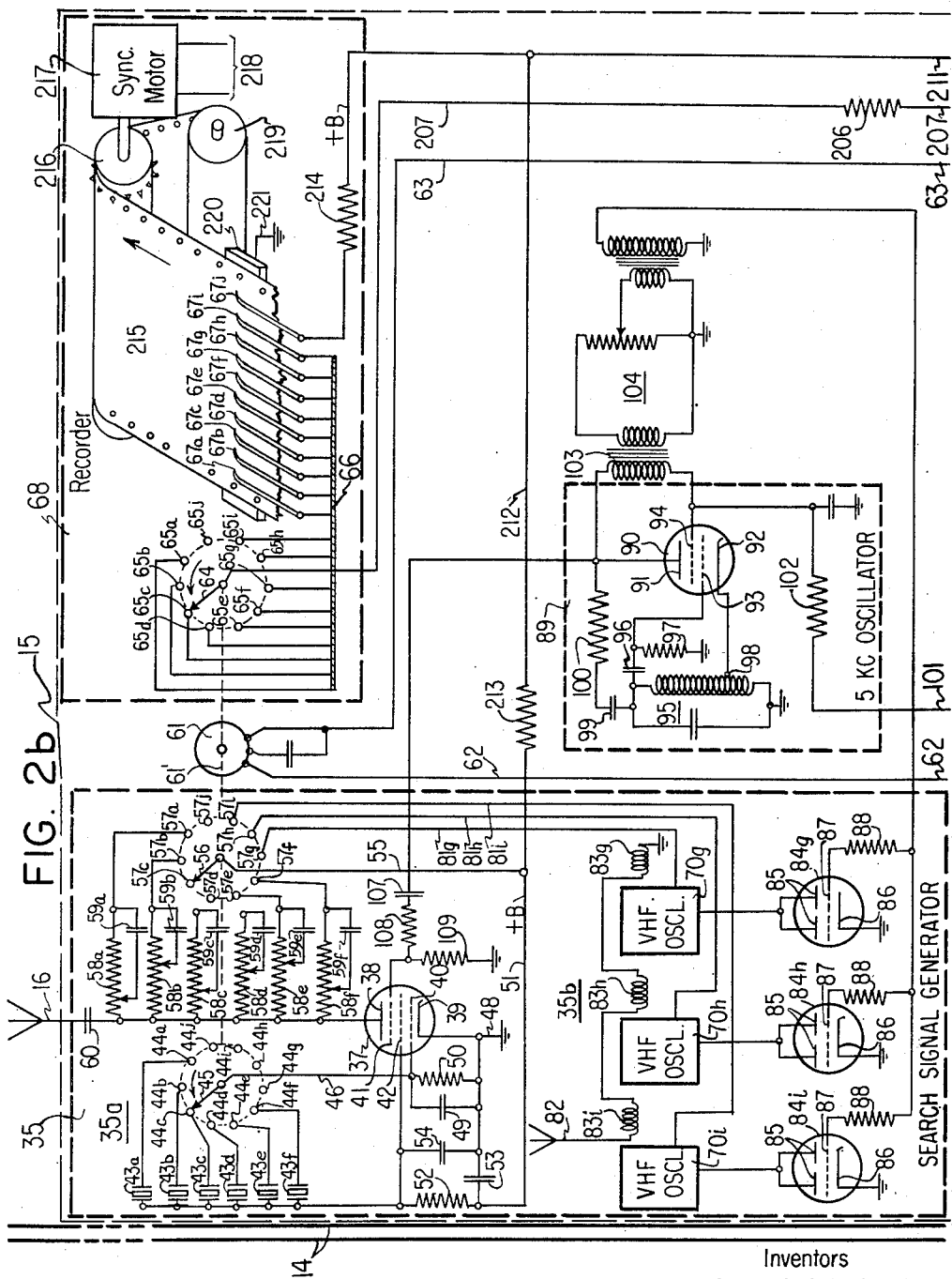

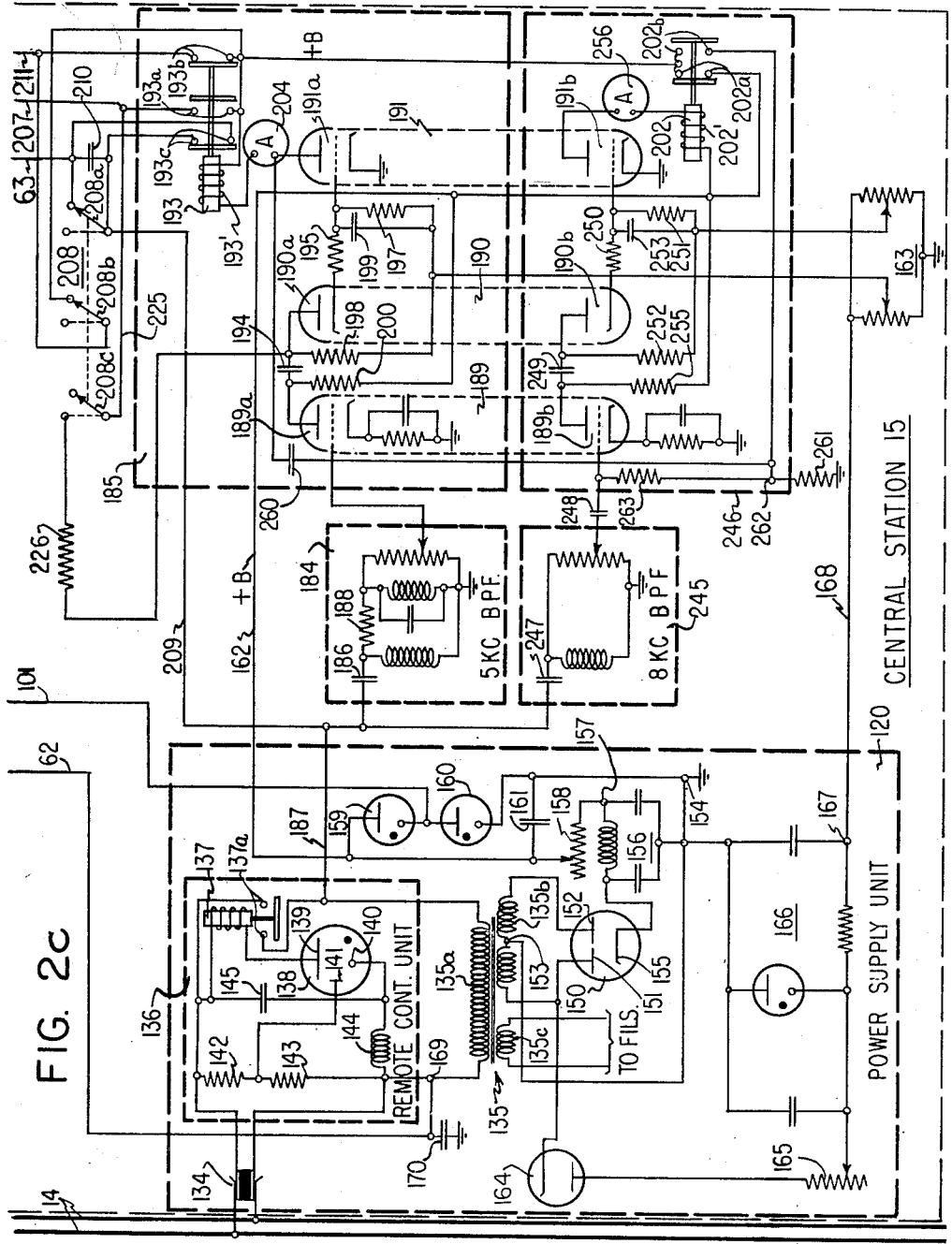

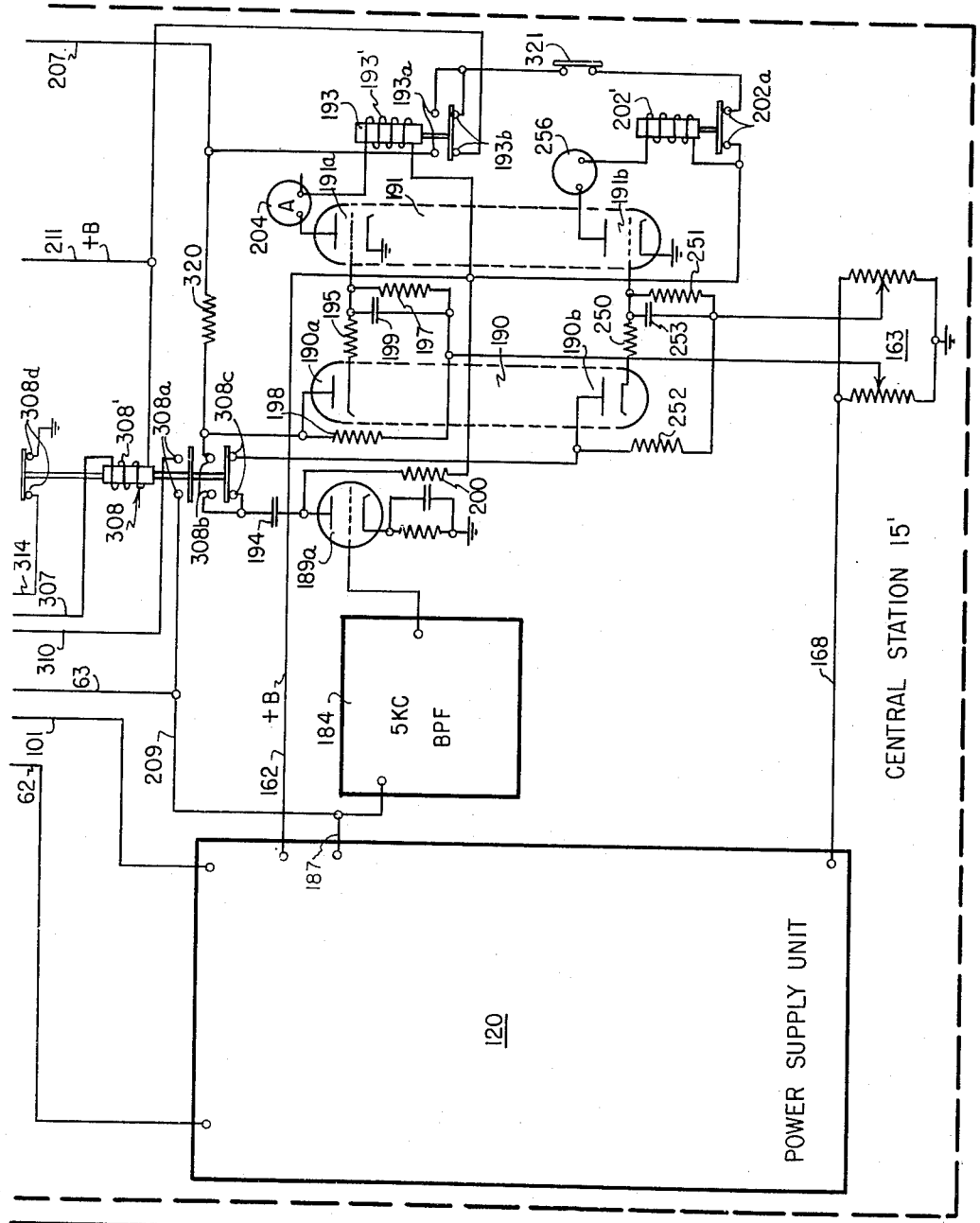

Patented Nov. 24, 1953

2,660,511

UNITED STATES PATENT OFFICE 2,660,511

LOCKOUT AND RECYCLING DEVICE FOR AN APPARATUS FOR DETERMINING THE LISTENING HABITS OF WAVE SIGNAL RECEIVER USERS

Serge A. Scherbatskoy, Tulsa, Okla., and Robert L. Freeman, Evanston, Ill., assignors to A. C. Nielsen Company, Chicago, Ill., a corporation of Illinois Application October 24, 1947, Serial No. 781,990

30 Claims. (Cl. 346—37)

The present invention relates to apparatus for determining the listening habits of users of wave signal receivers. More particularly the present invention is concerned with a lock-out and recycling device for use with such apparatus and particularly for use with apparatus of the type employing a search signal generator. Specifically the present invention is an improvement on the arrangements disclosed and claimed in co-pending Scherbatskoy application, Serial Nos. 781,988 and 781,989, and co-pending Richards application, Serial No. 781,786 filed concurrently, herewith, and all assigned to the same assignee as the present application.

In the above mentioned co-pending applications there are disclosed and claimed various arrangements of the so-called "search signal type" of apparatus for obtaining with instrumented methods a continuous record of the transmitting stations to which a wave signal receiver is tuned, from which it is readily possible to analyze the listening habits of the users of such wave signal receiver. In such instrumented methods of determining the listening habits of wave signal receiver users the receivers in a large number of homes are metered or monitored to afford the basic information. From this information a statistical analysis of the various factors affecting the sales effectiveness of particular radio programs may accordingly be arrived at. In such a system employing instrumented methods it is contemplated that the selection of the system collaborator homes—that is the homes in which wave signal receiver use is to be logged—shall be on the basis such that all of the various factors, as for example the number of potential listeners, economic affluence, religion, etc. which normally affect any process of sampling public opinion are accounted for on a weighted basis.

In the search signal type of device described and claimed in the abovementioned co-pending applications a search signal generator is employed which, in a more specific arrangement, cyclically, as for example, once per minute, scans the frequency spectrum by sending out a search signal which continuously or discontinuously varies in frequency during the cycle. This search signal has such a frequency composition that when the search signal frequency bears a predetermined relationship to that of the pass band to which the wave signal receiver being logged is tuned a response is produced in the wave signal receiver. In at least one embodiment of the search signal type of device, a single frequency component or monochromatic signal such as the output of a 5 or 6 kc. oscillator is superimposed on the search signal. The response produced in the wave signal receiver which might be referred to as a search tone is a signal having a frequency corresponding to the output of the 5 or 6 kc. oscillator. This response must be capable of being measured and this is accomplished by transmitting it to a recorder unit where a record of the response is made, the position of the response during the scanning cycle of the search signal generator being indicative of the particular frequency channel or pass band to which the wave signal receiver is tuned. By employing a monochromatic signal it is possible to make the response so weak as to be substantially inaudible, and yet with sufficient filtering and amplification it is capable of being measured without difficulty.

Since the strength of the search tone is greatly affected by the conditioning of a receiver automatic volume control system for transmitter signals of various strength, there will be times when there is produced an audible heterodyne note or even search tone during the scanning cycle as the frequency of the search signal approaches and passes beyond the frequency of the carrier to which the wave signal receiver is tuned. In the above-mentioned co-pending Scherbatskoy applications there are disclosed and claimed various means for producing a search signal which is substantially incapable of producing a heterodyne note due to intermodulation of the station carrier and the search signal. One such search signal included a random phase modulation component.

Even when the response produced by the search signal in the wave signal receiver being monitored is relatively inaudible and the heterodyne note is substantially inaudible the constant reoccurrence thereof once per minute may still be disturbing. Also it may cause substantial interference, in neighboring radios, particularly if the receiver being monitored is in an apartment building or other more congested residential area. It would be desirable therefore to provide a search signal type of device in which as soon as the tuning of the wave signal receiver being monitored is determined the periodic production of the search signal, at least on the channel tuned in by the receiver, is discontinued until the tuning of the wave signal receiver is changed.

Accordingly, it is an object of the present invention to provide an arrangement whereby lock out of the search signal generator with reference to one or more or all frequency channels occurs within a very short period after the wave signal receiver being monitored is tuned to a transmitting station.

It is another object of the present invention to provide a search signal type of device in which the receiver response is produced in the receiver being monitored only when the tuning of the wave signal receiver is changed.

It is another object of the present invention to provide a search signal type of device with means for discontinuing the operation of the search signal generator after the wave signal receiver has been tuned to a particular station, and to initiate the operation of the search signal generator whenever the tuning of the wave signal receiver is changed.

Still another object of the present invention is to provide an apparatus for determining the tuning condition of a wave signal receiver of the type in which the bulk of the apparatus is remote from the receiver being monitored and unconnected thereto except through a common power supply, and in which the apparatus is normally de-energized unless the wave signal receiver is turned on.

It is a still further object of the present invention to provide a lock-out arrangement for a search signal type of device for monitoring the tuning condition of a wave signal receiver in which lock-out of the search signal generator occurs on only a few channels such as one for example, and recycling of the search signal generator occurs in dependence upon the occurrence of a response in a different channel.

It is a further object of the present invention to provide means for insuring recycling of the search signal generator whenever inadvertent lock-out thereof occurs.

Further objects and advantages of the present invention will become apparent as the following description proceeds and the features of novelty which characterize the invention will be pointed out with particularity in the claims annexed to and forming a part of this specification.

For a better understanding of the present invention reference may be had to the accompanying drawings in which Fig. 1 is a block diagram of a search signal type of apparatus embodying the present invention for monitoring a wave signal receiver;

Figs. 2a, 2b, and 2c are diagrammatic illustrations showing first, second and third portions of the system of Fig. 1 arranged so as to be united into a single disclosure for illustrating the details of the system of Fig. 1, Fig. 2a showing the details of the wave signal receiver and receiver attachment, and Figs. 2b and 2c showing the details of the central station;

Fig. 3 is a schematic diagram of a detail of the arrangement shown in Fig. 2b; and Figs. 4a and 4b are diagrammatic illustrations showing first and second portions of a modification of the present invention arranged so as to be united into a single disclosure.

It will be understand that the lock-out and recycling devices of the present invention are applicable to various types of apparatus for indicating the tuning condition of wave signal receivers. For the purpose of a complete disclosure the invention is illustrated as applied to the specific apparatus disclosed in co-pending Scherbatskoy application, Serial No. 781,989 referred to above. As illustrated there is provided a search signal type of device for metering or monitoring a wave signal receiver to produce a record with respect to time of the tuning condition of such receiver. The search signal generator comprises means for producing a signal varying in frequency in a series of successively occurring steps, each step comprising a discrete frequency falling within various bands to which the receiver is likely to be tuned. The search signal generator operates to produce the signal of step wise varying frequencies during a scanning cycle preferably having a period of one minute. The spectral composition of the cyclically produced search signal includes a modulation component preferably in the form of a monochromatic frequency capable of producing a response in the wave signal receiver in the form of a search tone. The instant during the search cycle that a search tone or response is produced in the wave signal receiver being monitored is indicative of the particular frequency step of the search signal then being produced and consequently indicative of the particular transmitting station to which said wave signal receiver is tuned. A continuous record of this response with respect to the beginning of the search cycle provides a continuous record of the stations to which the wave signal receiver is tuned. The present invention is particularly concerned with arrangements for eliminating any undesirable effect from the audibility standpoint of the search tone or response.

Referring now to Fig. 1 of the drawings there is illustrated a wave signal receiver 10 to be monitored by the apparatus of the present invention. This wave signal receiver may be any type of wave signal receiver and need not be the well-known superheterodyne type of receiver which is the only type that can be monitored by some prior art devices. The wave signal receiver 10 is illustrated as comprising an antenna ground circuit 11 and a signal reproducer or loud speaker 12. Associated with the wave signal receiver 10 is a portion of the apparatus which might be referred to as the receiver attachment 13. This receiver attachment is of relatively small bulk which is generally capable of being disposed within the available space in even very small receiver cabinets. The receiver attachment 13 and the receiver 10 are connected to a power supply such as the house wiring circuit 14 in a manner understood by those skilled in the art. The house wiring circuit 14 provides a source of power for the receiver and also provides a channel whereby the receiver response which is converted into a transmittable signal by the receiver attachment 13 can be transmitted to the central station generally designated at 15 preferably located in any suitable place such as the basement or a closet of the home in which the wave signal receiver 10 is located. The central station 15 includes the precision apparatus which may have substantial bulk for recording the station response and also includes the search signal generator to be described hereinafter. A suitable transmitting antenna 16 is shown associated with the central station 15 whereby the search signal is transmitted so as to be picked up by the antenna ground circuit 11 of the wave signal receiver 10. The house wiring circuit 14 is illustrated as comprising a dotted line section to indicate the remote relationship of the receiver 10 and the central station 15.

For the purpose of picking out the search tone or response produced in the receiver 10 by virtue of the receipt of the search signal, the receiver attachment 13 is illustrated as connected to a circuit such for example as the audio circuit of the wave signal receiver 10 preferably ahead of any tone or volume control in the receiver by means of a conductor 17. As is disclosed in one of the above mentioned Scherbatskoy co-pending applications however such a connection with the receiver 10 is very simple and does not require disturbing the high frequency circuits in the receiver. Furthermore as is also disclosed in the above mentioned Scherbatskoy co-pending applications such a connection with the receiver may be completely dispensed with if desired. It will be apparent that such an arrangement little or no resistance will be encountered in placing such equipment in a collaborator's home. The receiver attachment 13 is of such small bulk that in many cases it may comprise a volume no greater than that of an ordinary cigarette package and if no attachment whatever is made with the receiver the collaborater will have no fear that the operation of his receiver will be impaired. Furthermore the more bulky apparatus is located in an out-of-the-way place in the home and no connections with this apparatus and the receiver are required other than connections of the individual apparatus to the house wiring circuit which is assumed to be present both where the receiver is located and where the central station is located.

Referring now to Fig. 2a of the drawings it will be noted that the details of the wave signal receiver 10 and the receiver attachment 13 are shown, although the particular construction of the wave signal receiver 10 forms no part of the present invention. For the purpose of making a complete disclosure the wave signal receiver 10 is depicted as of the well-known superheterodyne type although it might equally comprise some other type of receiver. As illustrated the wave signal receiver 10 comprises a power supply unit 20 which is connected to the receiver attachment 13 through a plug connector 21 and a manually actuated switch 22. The primary winding 23 of the power supply transformer is shown connected in series with the manually operable switch 22. It should be understood that the switch 22 is preferably the standard form of switch employed on radio receivers which usually is combined with the volume control. In addition to the power supply unit the wave signal receiver 10 comprises a tunable radio frequency amplifier unit 24, an oscillator modulator unit 25, an intermediate frequency amplifier unit 26, a detector and automatic gain control unit 27, and an audio frequency amplifier unit 28 connected in tandem in the order named. The antenna ground circuit 11 is connected to the input of the tunable radio frequency amplifier 24, while the signal reproducer or loud speaker 12 is connected to the output of the audio frequency amplifier 28. The power supply unit 20 is illustrated as being interconnected with the various stages of the wave signal receiver 10 for supplying the necessary plate voltage as well as filament current. The detector and automatic gain control unit 27 is illustrated as being interconnected with several of the preceding stages by the automatic volume control circuit 29. As illustrated the detector and automatic gain control unit 27 includes a detector tube 30 which has its plate circuit connected through a suitable tuned circuit 30a, a coupling capacitor 31 and a portion of a manually adjustable volume control resistor 32 to the control electrode or grid of an electron discharge valve 33 which may comprise the first audio stage of the wave signal receiver 10. The top of the automatic volume control resistor 32 is designated by the reference numeral 32a. It will be understood that this point 32a is readily available in most wave signal receivers such as 10 without in any way disturbing the electrical circuits therein.

The operation of the wave signal receiver 10 described above will be apparent to those skilled in the art. Briefly radio frequency signals are selected and amplified by the tunable radio frequency amplifier 24. These selected signals are supplied to the oscillator modulator unit 25 where they are converted to a fixed intermediate frequency which is amplified in the intermediate frequency amplifier unit 26 and subsequently detected in the detector stage 27. These detected modulation signals of audio frequency are amplified by the audio frequency amplifier and reproduced in audible form by the signal reproducer 12.

Before considering the details of the receiver attachment designated as 13 in Fig. 2a of the drawings whose purpose is to convert a suitable response or search tone in the wave signal receiver 10 to a measurable signal which can be transmitted to the recording unit in the central station 15, reference may first be had to Fig. 2b of the drawings wherein is disclosed a portion of the apparatus of the central station 15. Although any type of search signal generator may be employed there is illustrated the so-called "center frequency" search signal generator designated generally by the reference numeral 35. This search signal generator 35 is capable of producing during each scanning cycle a search signal the frequency of which varies in a series of discrete frequency steps, the frequency of each step being substantially equal to the transmitting frequency of an associated transmitter likely to be tuned in by the wave signal receiver 10. Any suitable means for producing such a search signal may be employed. As illustrated the search signal generator 35 includes a section 35a comprising an oscillator controlled by a plurality of crystals which are capable of producing the rigorously controlled frequencies desired. Satisfactory crystals for producing frequencies in the frequency modulation band are not available and accordingly the section 35b of the search signal generator 35 is provided for producing during the search signal cycle a plurality of discrete frequencies in the frequency modulation band.

The section 35a of the search signal generator 35 includes an electron discharge valve 37 which is specifically illustrated as a pentode having an anode 38, a cathode 39, a control electrode 40, a suppressor grid 41 and a screen grid 42. For the purpose of producing a variable frequency search signal the frequency of which varies in a stepwise manner, the pentode 37 is operated as a crystal oscillator of the Pierce type with the discrete frequency steps accurately controlled by a plurality of crystals designated as 43a, 43b, 43c, 43d, 43e and 43f which are arranged to be successively connected, once during earth scanning cycle, into the oscillator circuit including the electron discharge valve 37. As mentioned above each of the crystals 43a, 43b, 43c, 43d, 43e, and 43f is chosen to have a frequency which coincides with the frequency of a different one of the transmitting stations within the standard broadcast band likely to be tuned in by the wave signal receiver 10. It will be understood that for different localities different crystals will be chosen. Preferably the crystal 43a has the lowest natural frequency somewhere within the range of 550 to 1600 kc. and the others are of progressively higher frequencies within the same range. Although only six such crystals are illustrated it should be understood that any desired number might be employed depending upon the number of transmitters to which the wave signal receiver 10 is likely to be tuned. The six crystals are illustrated by way of example only and the specific number chosen is unimportant as far as the present invention is concerned.

For the purpose of selectively connecting one crystal at a time into the oscillator circuit each crystal has one terminal thereof connected to the screen grid 42 of the electron discharge valve 41. The other terminals of the crystals 43a, 43b, 43c, 43d, 43e and 43f are each connected to a different one of a plurality of contacts 44a, 44b, 44c, 44d, 44e and 44f repectively which are arranged together with a plurality of contacts 44g, 44h, 44i and 44j along with the periphery of a circle in equally spaced relationship so as to form with a rotating switch arm 45 a rotating switch mechanism. As will be brought out in greater detail hereinafter the rotating switch arm 45 is preferably adapted to be driven at a constant angular speed preferably at one revolution per minute so that the terminals or contacts 44a to 44j are successively engaged at equally spaced time intervals. The terminals 44g, 44h, 44i and 44j have no function whatever and could be omitted so long as the space and arrangement of the other terminals remains unchanged. It ought furthermore be understood that if the section 35b of search signal generator 35 were not employed that the terminals 44a to 44f would preferably be arranged around the circumference of a circle at equally spaced intervals. Such an arrangement is shown in the above-mentioned co-pending Richards' application. However, the terminals 44g, 44h, and 44i correspond to intervals when search signals are produced by the section 35b of the search signal generator 35 and at those times and also at the time corresponding to the terminal 44j the section 35a of the search signal generator 35 is inactive.

In order that the crystals 43a to 43f are connected to control accurately the stepwise varying frequency of the search signal the movable switch arm 45 is connected by means of a conductor 46 to the control electrode 48 of electron discharge valve 37. The cathode 39 of the pentode 37 is preferably grounded as indicated at 48 and a suitable feed back capacitor 49 and a grid leak resistor 50 are provided. The screen grid 42 is furthermore connected to a conductor 51 through a voltage dropping resistor 52. The conductor 51 as will be described hereinafter is connected to a suitable source of +B potential. Suitable radio frequency bypass capacitors 53 and 54 are also provided. With this arrangement it is apparent that the crystals oscillate in the mode of the Pierce circuit.

In order that the search signal, varying in frequency in a stepwise fashion, appearing in the plate circuit of the pentode 37 is supplied to the transmitting antenna 16 so that it can be transmitted to the wave signal receiver 10 for interception by the antenna ground circuit 11, the plate circuit of the electron discharge valve 37 is connected to a source of +B potential such as the conductor 51 through a conductor 55, a plurality of parallel connected networks, and a rotatable antenna attenuator switch comprising the movable switch arm 56 and a plurality of contacts 57a, 57b, 57c, 57d, 57e, 57f, 57g, 57h, 57i, and 57j arranged in equally spaced relationship along the periphery of a circle. As illustrated the contacts 57a to 57j inclusive are positioned in exactly the same manner as the contacts 44a to 44j and the contacts marked with the corresponding letter are simultaneously engaged by the associated rotatable arms 56 and 45 respectively. Each of the parallel connected networks comprises a resistor 58 specifically designated as 58a, 58b, 58c, 58d, 58e and 58f respectively for the different networks and a capacitor 59 specifically designated as 59a, 59b, 59c, 59d, 59e and 59f respectively for the various networks. Each capacitor 59 is adapted to parallel a variable portion of its associated resistor 58. The resistors 58 are provided to insure that the direct current plate voltage remains constant at all times so as not to cause variations in the output frequency of the oscillator. However, for the purpose of producing the desired attenuation of the alternating current signals of discrete frequencies produced by virtue of the plurality of crystals 43a to 43f, the variable impedance paths through the capacitors 59 and the variable portions of the resistors 58 are provided. With this arrangement a uniform intensity of the search signal throughout the scanning cycle is obtained. The contacts 57g, 57h and 57i of the antenna attenuator switch are connected to the plate circuits of the oscillators of the section 35b of the search signal generator 35 so that +B plate potential may be applied thereto through the rotatable switch arm 56, and the conductor 55 at different predetermined instants during the search signal scanning cycle. The antenna 16 is coupled to the plate circuit of the pentode 37 by means of a suitable coupling capacitor 60.

In order to produce a search signal which comprises a plurality of discrete frequencies varying in a stepwise manner, each discrete frequency step occurring once during each search or scanning cycle and at exactly the same position during each cycle, there is provided a synchronous motor and gear train unit 61, which is adapted to be connected with the house wiring circuit 14 through suitable control circuits to be described hereinafter, including the conductors 62 and 63. Preferably the synchronous motor is adapted to rotate the switch arms 45 and 56 by means of an interconnecting shaft generally designated at 61' at one revolution per minute. The shaft 61' of the synchronous motor unit 61 is also adapted to rotate a third switch arm 64 which with the contacts 65a, 65b, 65c, 65d, 65e, 65f, 65g, 65h, 65i, and 65j provides a stylus selecting switch with reference to a plurality of styli 67 forming a part of a recorder unit 68. As illustrated the terminals or contacts 65a to 65i inclusive of the stylus selecting switch are adapted to be connected by suitable conductors extending in a cable 66 to the individual styli 67a, 67b, 67c, 67d, 67e, 67f, 67g, 67h, and 67i respectively of a recorder 68 to be described hereinafter in greater detail. The switch arms 45, 56 and 64 are all disposed in the same angular position with reference to shaft 61' so that the associated contacts marked with the same subscript are simultaneously contacted by all three switch arms 45, 56 and 64. Accordingly, the contacts or terminals 65a, 65b, 65c, 65d, 65e, 65f, 65g, 65h, 65i and 65j are also arranged along the periphery of a circle in exactly the same manner and order as the contacts or terminals 44 and 57. The synchronous motor 61 is preferably of a type which is capable of starting and stopping substantially instantaneously, the reason for which will become apparent from the following description.

Although the wave signal receiver 10 has been illustrated as one for receiving the standard broadcast band, it will be understood that it might equally well be a frequency modulation receiver or at least be provided with a frequency modulation channel. In order that information with respect to the tuning of a wave signal receiver to stations transmitting frequency modulated signals may be recorded, the frequency spectrum of the frequency modulation band must also be scanned by the search signal generator 35. As was mentioned above crystals capable of producing oscillations in the frequency modulation band are not generally available. If they were the search signal generator 35 would merely be provided with additional crystals each having a natural frequency corresponding to the transmitting frequencies of different frequency modulation stations to which the wave signal receiver being monitored is likely to be tuned. As was brought out above by having the search signal frequency during each scanning cycle composed of a plurality of discrete frequency steps, the frequency of each step being equal to the transmitting frequencies of a plurality of different transmitting stations to which the wave signal receiver might be tuned, no audible variable pitch heterodyne note can be produced, since to produce an audible variable pitch heterodyne note it is necessary to have two inter-modulated frequencies which produce a variable frequency beat frequency in the audible range. Furthermore when the frequencies of the intermodulated signals are almost exactly equal the beat frequency is obviously inaudible. In view of the present invention as will become apparent from the following description absolute inaudibility is not a requirement.

As illustrated in the drawings the section 35b of the search signal generator 35 is capable of producing a search signal whose frequency varies in a stepwise fashion, in three discrete frequency steps during each cycle of the search signal which steps are a continuation of the discrete frequency steps produced by section 35a of the search signal generator 35. In other words the search signal generator 35 produces a search signal having nine discrete frequency steps, six of which are within the standard broadcast band produced by the section 35a and three of which are in the frequency modulation band produced by section 35b.

As illustrated in Fig. 2b of the drawings, the section 35b of the search signal generator 35 includes three very high frequency oscillators hereinafter designated as V. H. F. oscillators 70 and specifically designated by the reference numerals 70g, 70h and 70i to correspond with the contacts 57g, 57h and 57i respectively, to which the plate circuits of the V. H. F. oscillators 70 are respectively connected. The details of the V. H. F. oscillators 70 form no part of the present invention and are shown in block diagram in Fig. 2b of the drawings. However, for the purpose of a complete disclosure, one type of V. H. F. oscillator which was satisfactorily employed is illustrated in Fig. 3 of the drawings and is substantially identical with the V. H. F. oscillator described as a tuned circuit oscillator for the very high frequency range at pages 372 and 373 of the 1946 edition of The Radio Amateur's Handbook.

The V. H. F. oscillator 70i which is identical with the oscillators 70h and 70g is shown in unconventional fashion in Fig. 3 of the drawings to show how the tube elements are tied in with circuit construction. The corresponding parts are designated by the same reference numerals as in the preceding figure. Basically, the oscillator comprises two heavy brass plates 71a and 71b which act both as tube mounting supports and as the stator plates of the tuning condensers 72 and 73 respectively. For the purpose of reducing the circuit inductance an electron discharge valve of the 6F4 type which has symmetrically arranged grid and plate leads is employed, designated as 74 in the drawings. This tube or valve 74 comprises an anode 75 supported by the brass plate 71a, a cathode 76, a control electrode or grid 77 supported by the plate 71b, and a filament 78. The inductance is furthermore kept low by shunting the lead wires to the tube 74 by the low inductance brass plates 71a and 71b. A pair of small inductance coils 79a and 79b which represent most of the inductance of the circuit are connected to the brass plate 71a. By properly choosing these coils and properly adjusting the capacitors 72 and 73 the desired oscillator frequency may be obtained. Plate potential or +B potential is supplied to a tap 83 on one of the inductances such as 79a through a suitable voltage dropping resistor 80 from an associated contact such as 57i of the rotary switch including the switch arm 56. With this arrangement it is apparent that +B potential from the conductor 51 is applied successively to the oscillators 70g, 70h and 70i in that order at the instants the associated terminals 57g, 57h and 57i respectively are contacted by the rotating switch arm 56. The leads interconnecting the taps 57g, 57h and 57i with the plate circuits of the oscillators 70g, 70h and 70i respectively are designated by the reference numerals 81g, 81h and 81i respectively. In order to supply the oscillations to a transmitting antenna which may be the antenna 16, but preferably is a separate antenna such as 82, one of the windings such as 79a is inductively coupled to a winding 83i in the circuit of the antenna 82. The plate circuits of the oscillators 70g and 70h are also inductively coupled to the antenna 82 through windings 83g, and 83h respectively connected in series with the winding 83i as is clearly shown in Fig. 2b of the drawings.

For the purpose of controlling the oscillations of the V. H. F. oscillators 70 a variable resistance is connected in series with each of the cathodes 76. As illustrated in Fig. 2b of the drawings variable resistors in the form of electron discharge valves 84g, 84h and 84i respectively are connected in series with the cathodes 76 of each of the associated V. H. F. oscillators 70g, 70h and 70i respectively. As illustrated, each of the electron discharge valves 84 is a twin triode comprising a pair of anodes 85, a grounded cathode 86 and a control electrode or grid 87. The plate circuits of each valve are connected in parallel to produce a low internal tube resistance. The oscillator circuits are so adjusted that when zero or a positive voltage is applied to the control electrodes 87 which are all connected in parallel through suitable parallel arranged resistors 88, the oscillators will produce oscillations when supplied with plate potential.

From the detailed description included above it is apparent that the search signal generator 35 produces a search signal which scans both the amplitude modulation and the frequency modulation frequency spectrum in a series of discrete frequency steps each step having a frequency equal to that of various amplitude modulation and frequency transmitters which are likely to be tuned in by the wave signal receiver being metered or monitored.

For the purpose of producing a recordable index signal of the tuning condition of the wave signal receiver 10 the spectral composition of the search signal produced by the search signal generator 35 should be such that it is capable of producing a response in a frequency selective circuit such as the wave signal receiver 10. As was discussed in the above mentioned co-pending Scherbatskoy applications a very satisfactory search signal is one which includes a modulation component of a single component or monochromatic frequency which can be filtered by a narrow band pass filter and which furthermore is of such a frequency as to be outside the range of maximum sensitivity of both the wave signal receiver 10 and the human ear. A satisfactory monochromatic signal has been found to exist in the frequency range of 5,000 to 6,000 cycles. A response of this frequency produced in the receiver 10 is within the pass band of the receiver and such a response or search tone will be produced in the receiver whenever the frequency of the search signal produced by the search signal generator 35 is equal to the frequency of the station carrier tuned in by the wave signal receiver 10. Accordingly there is provided at the central station 15 a generator capable of generating a 5 kc. signal which is illustrated in Fig. 2b of the drawings as a 5 kc. oscillator 89 which is adapted to supply a modulation component to both sections 35a and 35b of the search signal generator 35.

It should be understood that the 5 kc. oscillator may comprise any standard form of oscillator capable of producing a monochromatic signal and the 5 kc. frequency is furthermore not essential since other frequencies might be employed such as 6 kc. for example. As illustrated oscillator 89 comprises an electron discharge valve 90 having an anode 91, a cathode 92, a control electrode 93 and a screen grid 94. A tank circuit 95 has one end thereof coupled to the control electrode 93 by means of a capacitor 96. This control electrode 93 is also connected to ground through a suitable grid leak resistor 97. For feed back purposes the cathode 92 is connected to a suitable tap 98 on the inductance of the tank circuit 95. The tank circuit 95 is also coupled to the plate circuit of the electron discharge valve 90 by means of a capacitor 99 and a resistor 100. The screen grid 94 is connected to a source of +B potential through a suitable conductor 101 and a voltage dropping resistor 102. The plate 91 is also connected to the conductor 101 through the resistor 102 and a winding 103. The winding 103 forms a part of a coupling means 104 for coupling the output of the oscillator 89 to the control electrodes 87 of the variable resistor tubes 85. Any other coupling means might be employed however. The 5 kc. output from the oscillator 89 therefore changes the conductivity of the tubes 85 and consequently the internal resistances thereof. When the internal resistance is decreased sufficiently the resonant circuits of the oscillators 70 are damped sufficiently to stop oscillations. Consequently the search signal produced by the section 35b of the search signal generator 35 in addition to varying in frequency in a stepwise manner is also pulsed or amplitude modulated at a frequency of 5 kc.

To cause the search signal produced by the section 35a of the search signal generator 35 to include a 5 kc. modulation component capable of producing a response in the wave signal receiver 10, the plate circuit of the 5 kc. oscillator 89 is also coupled to the suppressor grid 41 of the pentode 37 through a suitable coupling capacitor 107 and a resistor 108, which resistor 108 permits an initial adjustment to be made. The suppressor grid 41 is also grounded through a suitable resistor 109. Consequently the output of the search signal generator 35 comprises a search signal composed of a succession of discrete frequencies occurring in a stepwise fashion all amplitude modulated with a 5 kc. modulation component.

It will be understood that if no frequency-modulation channel is embodied in the wave signal receiver 10 that the section 35b of the search signal generator 35 may be omitted. It will be understood that any other type of search signal generator may also be employed so long as it is capable of producing during a scanning or search cycle a variable frequency signal either continuously or discontinuously variable as disclosed in the above mentioned copending application filed concurrently herewith.

It will be apparent that operation of the receiver attachment 13, the details of which are described hereinafter as well as operation of the central station 15 require a source of power both for the filaments of the tubes involved as well as for the plate potentials and the various bias potentials. It is furthermore desirable that such power be supplied only when it is desirable to monitor the receiver 10 and record information relative to the station or stations to which a receiver is tuned or in other words only when the receiver 10 is turned on. Obviously then the power supply for the receiver attachment 13 and the central station 15, should not be rendered effective to supply the necessary electrical energy unless the receiver 10 is turned on.

The power supply unit for the receiver attachment is specifically designated in Fig. 2a of the drawings by the reference numeral 110. Preferably the power supply unit 110 is connected through the contacts 111a of a relay 111 and the plug connector 21a to the house wiring circuit 14. The winding of the relay 111 is connected in series with the receiver power supply through the manually actuable switch 22 of the receiver 10 and the plug contact 21. Whenever the receiver 10 is turned on through closing of the switch 22 current flows to the receiver power supply unit 20 which is of sufficient magnitude to pick up relay 111 and close the contacts 111a with the result that the power supply unit 110 is energized. This power supply unit includes an auto-transformer 112 to which is coupled a winding 113 for supplying the filaments of the electron discharge valves employed in the receiver attachment 13. The portion 112a of the auto-transformer 112 is connected through the contacts 111a across the house wiring circuit 14 through the connector or plug contact 21a. The complete transformer winding on the other hand is connected in series with the rectifiers 114 and 115 and a suitable resistor 116 with the plate circuits of the electron discharge valves in the receiver attachment 13 so as to supply the necessary +B potential. A suitable filter capacitor 117 is connected across the output terminals of the +B source of potential for smoothing purposes. The other terminal of the power source 110 is grounded as indicated at 118.

As has been mentioned in connection with Fig.

1 of the drawings the only electrical circuit interconnecting the central station 15 and the wave signal receiver 10 is the house wiring circuit 14. This is also true of the receiver attachment 13 and the central station 15. It will be understood that the house wiring circuit 14 could be employed as a remote control circuit for energizing a power supply unit designated at 120 and located at the central station 15 in response to turning on the wave signal receiver 10 as by closing the switch 22. To this end there is provided in the receiver attachment 13 an oscillator 121 which is capable of producing a distinctive oscillation preferably above the audible range whenever the switch 22 is closed. As illustrated the oscillator 121 is designated as a 9 kc. oscillator. Any conventional type of oscillator may be employed for this purpose and as shown in the drawings this oscillator comprises an electron discharge valve 122 having a cathode 123, an anode 124 and a control electrode 125. The tank circuit for the oscillator comprises an inductance 126 and a capacitance 127. The tank circuit is magnetically coupled as by the winding 128 and the coupling capacitor 129 with the control electrode or grid 125 and the oscillator tube 122. The control electrode 122 is connected to the cathode 123 through a grid leak resistor 130 grounded as indicated. A source of plate potential from the output of the power supply unit 110 is connected to the anode 124 through the inductance 126 and a conductor 131. The plate or output circuit of the 9 kc. oscillator 121 is connected through a conductor 132 to the ungrounded side of the house wiring circuit 14 whereby the 9 kc. oscillations are transmitted along the house wiring circuit 14. It will be apparent that these 9 kc. oscillations superimposed on the 60-cycle 110-volt house wiring circuit will cause no interference with the wave signal receiver 10 since the frequency is above the audible range of both the signal reproducer 12 and the human ear.

The power supply unit 120 at the central station 15 comprises a power supply transformer 135, the primary winding 135a of which is connected across the house wiring circuit 14 through a suitable plug connector generally indicated at 134 and the contacts 137a of a relay 137 forming a part of a remote control unit 136. The remote control unit 136 includes means for closing the normally open contacts 137a of the relay 137 in response to the closing of the wave signal receiver switch 22 which causes a 9 kc. signal as described above to be supplied to the remote control unit 136. As illustrated the remote control unit 136 includes a gas triode 138 the plate circuit of which is connected in series with the winding of the relay 137. This gas triode 138 includes an anode 139, an ionic cathode 140 and a grid or starter anode 141. Such a gas triode 138 may be of the type designated as 0A4. In such a gas triode a relatively small amount of the electrical energy supplied to the starter anode 141 initiates a glow discharge between the cathode 140 and the starter anode 141 so as to start the main discharge between the plate 139 and the cathode 140 with the resultant energization of the relay 137 to close its contacts 137a. As illustrated the starter anode 141 is connected between two bleeder resistors 142 and 143 arranged in series across the house wiring circuit 14. With this arrangement the starter anode 141 is normally maintained at a potential which is below that required for breakdown. A tuned circuit comprising the inductance 144 and the capacitor 145 are also connected across the power line or house wiring circuit 14 in parallel with the bleeder resistors 142 and 143. The terminal of the capacitor 145 connected to the inductance 144 is connected to the cathode 140. This tuned circuit is made resonant at 9 kc., so that when the 9 kc. oscillations produced by the 9 kc. oscillator 121 are received at the remote control unit 136 a resonant voltage appears across each component of the tuned circuit comprising the inductance 144 and the capacitor 145. The effect of this voltage across the capacitor 145 is to increase the negative potential peaks on the cathode 140 and thus effectively to increase the potentials between the cathode 140 and the starter anode 141. Consequently these voltage peaks start a discharge between the cathode 140 and starter anode 141 so as to start the main discharge between the anode 139 and the cathode 140. Because alternating current is supplied to the anode 139 the gas triode 138 ceases to discharge when the 9 kc. oscillations are removed. Consequently the remote control unit 136 is capable of energizing and deenergizing the primary winding 135a of the power supply transformer 135 in response to the closing of the receiver switch 22 without any connection between the two circuits except the conventional power line.

The power supply unit 120 also includes a rectifier 150 whose anodes 151 and 152 are connected to the end terminals of the secondary winding 135b of the transformer 135 in the manner of a full-wave rectifier. The filament current for the electron discharge valves in the central station 15 including the rectifier 150 may be obtained from a suitable secondary winding 135c of the power transformer 135. The center terminal 153 of the transformer secondary winding 135b is grounded as indicated at 154 and provides the negative or ground terminal of the B potential source. The cathode 155 of the rectifier 150 is connected through a suitable smoothing filter 156 to the terminal 157 which is the +B terminal of the plate or B potential source. For the purpose of providing a regulated plate potential a series circuit comprising an adjustable resistor 158 and a pair of voltage regulator tubes 159 and 160 are connected across the terminals 154 and 157. Also a capacitor 161 is connected across the series connected voltage regulator tubes 159 and 160. The highly regulated +B potential appearing at the plate of the voltage regulator 159 is connected by means of a conductor 162 to control circuits described hereinafter. Another regulated source of +B potential appearing at the plate of the voltage regulator tube 160 is supplied to the conductor 101 which is connected to the 5 kc. oscillator 89 as described above. The voltage regulator tubes 159 and 160 are preferably the conventional gaseous regulator tubes and the resistor 158 is in effect a current limiting resistor connected in series with the gaseous voltage regulator tubes for producing satisfactory operation thereof.

The power supply unit 120 also supplies to a voltage divider unit 163 a suitable biasing potential. As illustrated a diode 164 has its cathode connected to one terminal of the secondary winding 135b of the transformer 135. The plate of the diode 164 is connected through an adjustable resistance 165 and a smoothing and voltage regulating unit 166 to the ground terminal 154. A negative biasing potential appearing at the terminal 167 is supplied to the voltage divider unit 163 by means of a conductor 168.

It should be noted that the conductor 62 from the synchronous motor 61 is connected to the grounded side of the house wiring circuit as indicated at 169. This side of the house wiring circuit is preferably grounded through a suitable capacitor 170, as far as the high frequencies transmitted thereover are concerned without however grounding the line as far as the 60-cycle power is concerned.

For the purpose of picking up a signal indicative of the response produced in the wave signal receiver 10 by the search signal created by the search signal generator 35 there is provided in the receiver attachment 13 a tuned amplifier unit generally designated at 175 which tuned amplifier unit is equivalent to a band pass filter and an amplifier. The details of the tuned amplifier unit 175 are unimportant as far as the present invention is concerned. This tuned amplifier is sharply tuned to a frequency of 5 kc., which is the frequency of the search tone produced in the receiver 10 as described above. To limit the frequencies picked up by the tuned amplifier 175 to a very narrow frequency band it is provided with three cascaded tuned circuits comprising the tuned circuits 176, 177 and 178. The tuned amplifier 175 further includes a plurality of electron discharge valves 179, 180, and 181 for amplifying the 5 kc. signal supplied to the tuned amplifier 175. The plate circuits of these electron discharge valves are connected to the conductor 131 mentioned above which is connected to the source of plate potential at the power supply unit 110.

In order that the response produced in the wave signal receiver 10 may be received by the tuned amplifier 175 the input thereof may be coupled through a coupling capacitor 182 to a microphone or the like positioned adjacent the signal reproducer 12 of the wave signal receiver 10, or as illustrated, may be connected to the terminal 32a at the top of the volume control of the wave signal receiver 10. Preferably the capacitor 182 is very small. Such a connection can readily be made without disturbing the high frequency circuits or even the audio circuits of the receiver 10. The alternative arrangement suggested above employing a microphone is shown in the co-pending Scherbatskoy application Serial No. 781,988 referred to above and no connection whatever with the receiver is required in such case.

As illustrated in the drawings the output of the tuned amplifier 175 is connected by means of a coupling capacitor 183, which resonates with inductance to form one tuned circuit of the tuned circuit 178 and the conductor 132 with the house wiring circuit 14 so that the response in the form of a 5 kc. signal may be supplied to the central station 15 to be recorded by the recorder 68.

In order that a record of the search tone produced in the receiver 10 may be made by the recorder 68, the central station 15 is provided with a 5 kc. control channel comprising a 5 kc. band pass filter 184 and a 5 kc. amplifier and relay unit 185. The 5 kc. band pass filter 184 is connected through a coupling capacitor 186 and a conductor 187 to the ungrounded side of the house wiring circuit 14 through the contacts 137a of the relay 137. The capacitor 186 prevents 60-cycle current from entering the 5 kc. channel while still providing a path for the 5 kc. current. The 5 kc. filter 184 is a very sensitive filter illustrated as a 2-mesh filter. It is apparent therefore that very high selectivity of the 5 kc. search tone frequency is obtained since the tuned amplifier 175 in the receiver attachment is provided with three tuned circuits, each circuit tuned to 5 kc., and the band pass filter 184, is provided with a two-mesh tuned circuit. The band pass filter 184 also includes a built in attenuator comprising the resistor 188.

In order that the single frequency component or monochromatic signal passed by the band pass filter 184 may be caused to produce a record of the response in the recorder unit 68, to be described hereinafter, the output of the band pass filter 184 is preferably supplied in succession to a 5 kc. amplifier 189a, a rectifier 190a, and a direct current amplifier 191a which is adapted to control the energization of a stylus control relay 193 all forming a part of the 5 kc. amplifier and relay unit 185. As illustrated the 5 kc. amplifier 189a comprises a section of a twin triode 189 while the rectifier 190a comprises a section of the twin diode 190. Also the direct current amplifier 191a comprises a section of the twin triode 191. The other sections of the twin tubes 189, 190 and 191 will be described in connection with the functions which they perform described hereinafter. It will be understood that separate tubes may be employed rather than the twin tubes illustrated. The control electrode of the 5 kc. amplifier 189a is connected to a suitable voltage divider disposed at the output of the band pass filter 184. The plate circuit of the amplifier 189a is coupled to the rectifier 190a through a suitable coupling capacitor 194. The cathode of the rectifier 190a is connected through a resistor 195 with the control electrode of the direct current amplifier 191a. In order to prevent operation of the 5 kc. amplifier and relay unit 185 unless a 5 kc. signal representative of the search tone or response in the receiver 10 is applied thereto negative bias potential from the voltage divider unit 163 is supplied to the control electrode of the direct current amplifier 191a through a resistor 197. A suitable capacitor 199 connected across the resistor 197 cooperates with the resistor 195 so as to provide a circuit with a long time constant to prevent any signal such as static or an occasional click from causing inadvertent operation of the 5 kc. amplifier and relay unit 185. This arrangement insures operation of the stylus control relay 193 only in response to the existence of a true search tone produced by virtue of the operation of the search signal generator 35.

Plate potential is supplied to the amplifier 189a from the conductor 162 which is a source of +B potential through a coupling resistor 200. The plate circuit of the direct current amplifier 191a is also connected to the conductor 162 which is a source of +B potential through the normally closed contacts 202a, the winding 193' of the relay 193 and the milliammeter 204. The contacts 202a of a relay 202 are illustrated as forming a part of an additional control device to be described hereinafter, but it should be understood that the search signal type device described thus far will function without this relay. If this relay is omitted suitable means for bridging the circuit at the contacts 202a would be provided. The magnitude of the bias potential applied from the unit 163 to the control electrode of the D.-C. amplifier 191a is adjusted so that a low current of for example one milliampere flows through the milliammeter 204 and the winding 193' of the associated relay 193 when no 5 kc. signal is received by the 5 kc. amplifier and relay unit 185 which is insufficient to cause operation of the relay 193. When a response or search tone is produced in the wave signal receiver 10, however, a 5 kc. signal is transmitted through the 5 kc. channel in the central station 15 which is rectified by the rectifier 190a and supplied to the control electrode of the direct current amplifier 191a to cause a substantially larger current as for example a current of 15 milliamperes to flow through the winding 193' of the stylus control relay 193 whereupon this relay is energized to close its normally open contacts 193a.

It will be apparent from the above description that the amplifier 189a, the rectifier 190a, the direct current amplifier 191a and the relay 193 comprise a 5 kc. relay unit 185 which performs a control function whenever a signal responsive to the search tone produced in the wave signal receiver is applied to the control electrode of the amplifier 189a. This unit 185 is adapted to control the operation of the styli 67 of the recorder 68. As illustrated the closing of the contacts 193a supplies +B potential from the conductor 162 to the switch arm 64 of the stylus control switch through a voltage dropping resistor 206 and the conductor 207.

In describing the search signal generator 35 and the synchronous motor 61 no complete description was included as to the circuits for supplying alternating current to the synchronous motor 61 and +B potential to the search signal generator 35. As illustrated in the drawings, the synchronous motor 61 is connected to the house wiring circuit 14 through conductor 62 which leads directly to one side of the house wiring circuit and the conductor 63 which is connected to the other side of the house wiring circuit through the pole 208a of a 3-pole manually actuable control switch 208, the conductor 209, the conductor 187 and the contacts 137a of the relay 137 of the remote control unit 136. As long as the pole 208a of the manual switch 208 is in the solid line position indicated in the drawings the synchronous motor 61 is continuously energized whenever the switch 22 of the wave signal receiver 10 is closed. Such operation of the search signal generator is generally referred to as "continuous scanning operation" and the solid line position of the 3-pole switch 208 may be referred to as the "continuous scanning position." A suitable capacitor 210 is indicated as arranged in parallel with the switch pole 208a to eliminate arcing when the circuit to the synchronous motor 61 is interrupted. The manually actuable control switch 208 also includes a switch pole 208b and a switch pole 208c. In the "continuous scanning position" of the switch 208 the pole 208c performs no function. However, the pole 208b completes the circuit from the source of +B potential such as from the conductor 162 through the contacts 202a and the switch pole 208b to the search signal generator 35 and specifically to the conductors 55 and 51 through the conductor 211, the conductor 212 and the voltage dropping resistor 213. The pole 208b also supplies +B potential through the conductor 211 and a voltage dropping resistor 214 to a stylus 67j of the recorder 68 to be described hereinafter.

For the purpose of producing an appropriate record indicative of the tuning condition of the receiver 10 there is provided the recorder 68 referred to above and indicated as comprising ten styli 67a to 67j inclusive. It will be understood that the type of recorder employed is immaterial as far as the present invention is concerned and the particular recorder shown in the drawings is chosen by way of example only. As illustrated the recorder 68 includes a movable recording element 215, continuous movement of which in the direction of the arrow is caused by rotation of a sprocket 216. The recording element is specifically illustrated as a tape having perforations along the edges for engagement with the teeth on the sprocket 216. Preferably the sprocket 216 is driven by a synchronous motor 217 connected to a suitable source of power 218 so as to be driven continuously regardless of whether the other elements in the central station 15 are energized or not. Consequently the synchronous motor 217 should not be energized from the power supply unit 120 unless it is connected to the circuit ahead of the contacts 137a of the relay 137. The recorder 68 further includes a suitable take up spool 219 and a tape supply spool not shown. As illustrated the recording element or tape 215 is a chemically responsive element such for example as an electrolytic paper. When an electric current is passed through such an element a chemical action occurs which produces a trace thereon at the point of current flow. To this end the recording element or tape 215 passes over a conducting shoe 220 which is grounded as indicated at 221. It will be apparent therefore that whenever a potential such as a +B potential is supplied to any one of the styli 67a to 67j a current flows through the tape 215 and the resultant chemical action causes a trace to be produced on the recording element 215 beneath the contacting portion of the particular stylus 67 which is energized, since this contacting portion is directly over the grounded conducting shoe 220. Due to the positioning of the styli 67 transversely of the tape 215 the transverse position on the tape of the trace produced by the styli is indicative of the station to which the wave signal receiver 10 is tuned.

In view of the fact that the styli 67a to 67i are connected to various terminals of the stylus selecting switch comprising the rotatable arm 64, it will be apparent that a trace will be produced on the recording element 215 by whichever stylus is energized, when a search tone occurs in the receiver 10 during the scanning cycle of the search signal generator with the resultant energization of the stylus control relay 193 to close its contacts 193a. It will furthermore be apparent that each of the styli 67a to 67i corresponds to a particular frequency step in the search signal whose frequency varies in a step wise fashion during each cycle of the search signal generator and consequently corresponds to a particular pass band to which the wave signal receiver 10 may be tuned. If, for example, the wave signal receiver 10 is tuned to a transmitter having a frequency equal to that of the crystal 43a of the search signal generator 35, then it will be apparent that a search tone will occur in the wave signal receiver 10 whenever the rotatable switch arm 45 engages its contact 44a. This search tone will cause the stylus control relay 193 to close its contacts 193a in a manner described above at the instant the arm 45 engages its contact 44a. At this instant during the search cycle the arm 64 of the stylus selecting switch engages its contact 65a whereupon the stylus 67a is energized to produce a trace on the recording element 215. When the rotating switch arms 45, 56 and 64 leave their associated contacts marked with the subscript $a$ and the wave signal receiver 10 continues to be tuned to the transmitting station having a transmitting frequency corresponding to that of the crystal 43$a$ the search tone in the receiver is discontinued with the resultant deenergization of the relay 193. Furthermore the stylus selector switch having the rotatable arm 64 causes deenergization of the stylus 67$a$. During the succeeding cycles of the search signal generator 35 the stylus 67$a$ is again energized and this continues as long as the wave signal receiver 10 remains tuned to the transmitting station having a transmitting frequency equal to the frequency of the crystal 43$a$. Consequently a trace in the form of a dashed line will be produced by the stylus 67$a$ on the element 215 as long as the synchronous motor 61 is continuously energized and the tuning of the wave signal receiver 10 is unchanged. It will furthermore be apparent that if the wave signal receiver 10 is tuned to any other station corresponding to a frequency step in the cycle of the search signal generator 35 that a corresponding stylus 67 of the recorder 68 will be energized to produce a trace in the form of a dotted or dashed line on the recording element 215.

As a practical matter there is a limit to the number of styli 67 likely to be provided in the recorder 68. Generally the number of styli provided would correspond to the stations which are likely to be tuned in often by the wave signal receiver 10. Occasionally however, the wave signal receiver 10 will be tuned to stations other than those for which a stylus 67 is provided. Information relative to the tuning of the wave signal receiver 10 to stations other than those for which styli 67$a$ to 67$i$ are provided, is often very valuable to the analysis organization obtaining information relative to the listening habits of wave signal receiver users. Accordingly the recording stylus 67$j$ is provided in the recorder 68 which may be referred to as the "all other stations stylus." As is apparent from the above description the all other stations stylus 67$j$ is energized whenever the wave signal receiver 10 is turned on through operation of the switch 22. Consequently when only a trace by the stylus 67$j$ appears on the recording element 215 it indicates that the wave signal receiver 10 is tuned to what may be referred to as "all other stations," namely those stations for which no specific stylus 67 is provided in the recorder 68. Only when in addition to the trace produced by the stylus 67$j$ some other trace by some other stylus is also produced is the wave signal receiver 10 tuned to a transmitting station specifically provided for in the search signal generator 35. It will be apparent that if only the trace produced by the stylus 67$j$ appears on the recording element 215 for substantial periods of time that an indication is provided that the search signal generator 35 should be provided with means to produce additional or other steps in the search signal whose frequency varies in a stepwise manner.

In view of the detailed description included above the operation of the "center frequency" search signal type of device when set for continuous scanning operation will be apparent to those skilled in the art. As long as the wave signal receiver 10 is turned off the central station 15 is deenergized except for the recording element motor 217 which is preferably continuously energized. Upon actuation of the receiver switch 22 the central station 15 is energized through operation of the remote control unit 136 which causes power to be supplied to the driving motor 61 for the search signal generator 35 and associated apparatus. The resultant search signal produced during scanning cycles of preferably one minute duration vary in frequency in a stepwise fashion, each step having a frequency exactly equal to the transmitting frequency of certain chosen pass bands to which the wave signal receiver 10 is likely to be tuned. When the wave signal receiver 10 is tuned to a station having a frequency corresponding to the frequency of one of the discrete frequency steps of the search signal, the 5 kc. modulation component is detected in the wave signal receiver and a 5 kc. search tone is produced in the receiver which is converted to a signal by the receiver attachment 13 which is transmitted to the central station 15. This signal causes operation of the 5 kc. amplifier and relay unit 185 so as to energize the appropriate stylus 67 in the recorder 68. It will be understood that for "continuous scanning operation" the manual switch 208 might be omitted and the contacts associated with the poles 208$a$ and 208$b$ bridged by suitable conductor means. The continuous scanning aspect of the "center frequency" type of search signal device is very similar to that of the search signal device disclosed and claimed in the above mentioned co-pending Scherbatskoy application Serial No. 781,988. By employing the "center frequency principle" no audible heterodyne note occurs and the search signal may be generated with very simple means.

The search tone or response produced in the receiver 10 by virtue of the search signal is inaudible when it its intensity is carefully adjusted to the correct value. Such precise adjustment of the intensity of the search tone without automatic volume control means therefore is very difficult to attain. Consequently some audibility may exist which may be undesirable with the search tone continually recurring at one minute intervals. Such an audible search tone however would not be undesirable if it only occurred for a cycle or two while the tuning of the wave signal receiver 10 is changed. In accordance with the present invention a lock out device is provided whereby the search signal generator is locked out or prevented from operating once a station has been tuned in by the wave signal receiver. Such a lock out arrangement can be applied to all types of devices employing a cyclic frequency scanning device. As illustrated the manual control switch 208 is provided with a second position shown in dotted lines in Fig. 2c of the drawings which second position might be referred to as the lock out position. In this lockout position the switch poles 208$a$ and 208$b$ interrupt the power supply circuits to the synchronous motor 61 and the search signal generator 35 respectively.

With a lock out arrangement it is desirable to deenergize the search signal generator when a response or search tone is produced in the wave signal receiver indicating that the wave signal receiver is tuned to a particular transmitting station. Since the stylus controlled relay 193 operates in response to the existence of a 5 kc. search tone this stylus control relay may be provided with a dual function of also acting as a lock out relay. Accordingly and as illustrated in the drawings the relay 193 is provided in addition to the normally open contacts 193$a$ with two sets of normally closed contacts 193$b$ and 193$c$ respectively. The contacts 193$b$ are connected in parallel with the pole 208b of the manual control switch 208. The contacts 193c on the other hand are connected in parallel with the pole 208a of the manual control switch 208. With this arrangement it is apparent that with the switch 208 in the lock out position energization of the relay 193 causes opening of the contacts 193b and 193c so as to deenergize the synchronous motor 61, the search signal generator 35, and the "all other stations" styli 67j, thereby effectively producing a lock out operation as far as the search signal generator 35 is concerned.

It will be understood that without more the relay 193 will be deenergized as soon as the search tone stops and true lockout requires additional means for maintaining the relay 193 in an energized condition, once it has been picked up by the occurrence of a search tone in the wave signal receiver 10. To this end the contacts 193a of the relay 193 also control the supply of a potential from the +B source to the plate circuit of the rectifier 190a. This circuit to the plate of the rectifier 190a may be traced from the contacts 193a through the conductor 225, the pole 208c of the manual control switch 208 and the voltage dropping resistor 226. Application of a positive potential to the plate of the valve 190a provides a positive bias which is applied to the grid of the valve 191a, consequently maintaining plate current flow and continued energization of the relay 193 to maintain contacts 193a in the closed position. With this arrangement a true lockout of the search signal generator 35 is provided and an audible search tone in the receiver will not be undesirable since it occurs only at the instant of tuning. The "all other stations" stylus 67j will not produce a continuous trace whenever the receiver 10 is turned on with the above described lockout arrangement as is the case when the continuous scanning connections are completed by the switch 208, but the all other stations stylus 67j will produce a trace only when the wave signal receiver 10 is not tuned to one of the stations specifically provided for in the search signal generator 35 and the receiver 10 is turned on.

With the arrangement described above the search signal generator will remain locked out once it is locked out unless the receiver 10 is turned off each time before a new station is tuned in. This is not the general practice of users of wave signal receivers and in accordance with the present invention means for restarting the scanning cycle of the search signal generator when the tuning is changed are provided. It would be possible for example to provide a time controlled switch in the energization circuit of the stylus control and lock out relay 193 to periodically interrupt this circuit, as, for example, once every 10 minutes. Also recycling of the search signal generator following lock out might be controlled in response to any function representative of a change in the tuning of the wave signal receiver 10. It is known, for example that a change in the tuning of a wave signal receiver causes a change in the automatic volume control voltage which appears in the circuit 29. Consequently this voltage may be employed to control a recycling device for the lock out relay at the central station 15.

The use of the automatic volume control voltage as a means for initiating recycling of the search signal generator 35 has one disadvantage in that it is not readily available at the top of the volume control in some receivers due to the interposition of the capacitor 31, between the diode load resistor and the volume control. By virtue of the coupling capacitor 31 and the volume control resistor 32, a differentiating circuit is provided so that the potential at the terminal 32a is in effect a derivative of the automatic volume control voltage. By using the time integral of this voltage however a voltage substantially equivalent to the automatic volume control voltage is obtained. Accordingly the receiver attachment 13 is provided with an integrating device generally designated at 230, which is coupled to the top of the volume control 32 by means of a coupling capacitor 231. This integrating device comprises a resistor 232, one terminal of which is connected to ground through a capacitor 233. The output of the integrating device 230 is therefore substantially equivalent to the automatic volume control voltage especially with reference to changes in the automatic volume control voltage.

For the purpose of causing the change in automatic volume control voltage to produce recycling of the lock out device at the central station 15, means must be provided in the receiver attachment 13 for supplying a distinctive signal to the central station in response to a change in the automatic volume control voltage. Such a change in the automatic volume control voltage will be a low frequency change and accordingly the output of the integrating device 230 is connected to the control electrode of a low frequency amplifier 234a which is illustrated as comprising one part of a twin triode 234. Plate voltage for the amplifier 234a is supplied from a source of +B potential through a conductor 235 and a voltage dropping resistor 236. The amplified voltage at the output of the low frequency amplifier 234a is supplied through a suitable coupling capacitor 237 to a polarized relay 238 comprising a movable switch arm 239 and the contacts 238a and 238b, one disposed at either side of the switch arm 239. If the AVC voltage increases one of the contacts 238a or 238b is engaged by the switch arm 239. If the AVC voltage decreases the other contact is engaged by the switch arm 239. Suitable spring means, not shown, normally bias the switch arm to the intermediate position shown. As illustrated, movement of the switch arm in either direction to engage one or the other of the contacts 238a or 238b which are connected in parallel, causes operation of an oscillator 240 capable of producing a signal differing from any other signals transmitted to the central station 15. As illustrated, the oscillator 240, is specifically designated as an 8 kc. oscillator and comprises the triode 234b, forming a part of the twin triode 234. Plate potential for the triode 234b is supplied from the conductor 235. The output of the 8 kc. oscillator 240 is coupled to the house wiring circuit 14 through a conductor 242 and the conductor 132. With this arrangement it will be apparent that whenever a change in the automatic volume control voltage occurs a momentary 8 kc. signal is produced by the oscillator 240 and transmitted over the house wiring circuit 14 to the central station 15. As soon as the voltage of the automatic volume control circuit reaches an essentially steady state condition the relay 238 assumes the position shown in Fig. 2a of the drawings so as effectively to stop the operation of the 8 kc. oscillator 240.

In order that the 8 kc. oscillations of the recycling control device may perform a control function at the central station 15 there is provided at the central station 15 an 8 kc. control channel which is substantially identical with the 5 kc. control channel described above. As illustrated this 8 kc. control channel comprises an 8 kc. band pass filter 245 and an 8 kc. amplifier and relay unit 246, very similar to the corresponding units 184 and 185 respectively. As illustrated, the 8 kc. band pass filter 245 is coupled through a suitable coupling capacitor 247 with the conductor 187 which is connected to the ungrounded side of the house wiring circuit 14 through the contacts 137a of the relay 137. The output of the band pass filter 245 is coupled to the 8 kc. amplifier and relay unit 246 through a suitable coupling capacitor 248.

In order that the 8 kc. signal passed by the band pass filter 245 may initiate recycling of the search signal generator 35, it is preferably supplied in succession to an 8 kc. amplifier 189b, a rectifier 190b and a direct current amplifier 191b which direct current amplifier is adapted to control the energization of the winding 202' of the recycling control relay 202. The amplifiers 189b and 191b and the rectifier 190b are illustrated as forming a part of the twin tubes 189, 191 and 190 respectively, the other sections of which are employed as described above in the 5 kc. amplifier and relay unit 185. The output of the 8 kc. band pass filter 245 is connected to the control electrode of the amplifier 189b. The plate circuit of the amplifier 189b is coupled to the rectifier 190b through a suitable coupling capacitor 249. The cathode of the rectifier 190b is connected through a resistor 250 with the control electrode of the direct current amplifier 191b. In order to prevent operation of the 8 kc. amplifier and relay unit 246 unless an 8 kc. signal produced by the oscillator 240 is received a negative bias potential from the voltage divider 163 is supplied to the control electrode of the direct current amplifier 191b through a resistor 251, and to the plate of the rectifier 190b through a resistor 252. A suitable capacitor 253 connected across the resistor 251 cooperates with the resistor 250 so as to provide a circuit with a long time constant to prevent any signal such as static or an occasional click from causing inadvertent operation of the 8 kc. amplifier and relay unit 246.

Plate potential is supplied to the amplifier 189b from the conductor 162 which is a source of +B potential through a resistor 255. The plate circuit of the direct current amplifier 191b on the other hand is connected to the conductor 162 which is a source of +B potential through the winding 202' of the relay 202 and the milliammeter 256. The magnitude of the bias potential applied from the unit 163 to the control electrode of the direct current amplifier 191b is adjusted so that a low current for example of one milliampere flows through the milliammeter 256 and the winding 202' when no 8 kc. signal is received, which current is insufficient to cause operation of the relay 202. Upon the receipt of an 8 kc. signal, however, the direct current amplifier 191b is rendered much more conductive and a sufficiently higher current flows through the winding 202' causing the relay 202 to open its normally closed contacts 202a. Since the contacts 202a control the supply of +B potential to the winding 193' of the stylus control and lock out relay 193, energization of the recycling relay 202 causes deenergization of the lock out and stylus control relay 193. With this arrangement it is apparent that recycling of the search signal generator 35 through deenergization of the relay 193 is caused whenever the tuning of the wave signal receiver 10 is changed.

It will be apparent that any type of system employing a lock out arrangement responsive to the receipt of a particular type of signal can lock out in response to an incorrect signal. For the purpose of minimizing the possibility of locking out the search signal generator 35 in response to an incorrect signal the recycling control channel is in accordance with the present invention made more sensitive than the 5 kc. channel in the central station 15. This is true of the arrangement described above by virtue of the built in attenuator comprising the resistor 188 in the 5 kc. band pass filter 184, which is not present in the 8 kc. band pass filter 245. Consequently a sudden burst of static or a sudden very intense noise on the house wiring circuit 14 cannot cause incorrect logging of the tuning condition of the wave signal receiver 10 since it will also cause recycling. Consequently anything which causes false logging also causes immediate recycling.

If the search tone in the wave signal receiver should be too strong, as, for example, during daytime reception of a distant station which is normally received at night, such a strong search tone could cause slight operation of the automatic volume control circuit in the wave signal receiver 10, with the resultant recycling of the search signal generator 35. To avoid such undesirable recycling at the instant of logging the tuning condition of the wave signal receiver 10, means are provided to desensitize the recycling circuit at the instant of the production of the search tone. This is accomplished as illustrated in the drawings by employing the surge voltage produced in the plate circuit of the direct current amplifier 191a in response to the sudden increase in current causing energization of the relay 193 to desensitize the 8 kc. amplifier 189b. To this end the plate circuit of the direct current amplifier 191a is paralleled with a circuit comprising the capacitor 260 and the resistor 261. The negative pulse of voltage produced across the condenser 260 upon energization of the relay 193 appears at the ungrounded terminal of the resistor 261 designated at 262 and is supplied to the control electrode of the 8 kc. amplifier 189b through a voltage dropping resistor 263. It will be apparent that a voltage impulse will also be produced when the relay 193 is deenergized, but since the impulse is in the reverse direction it will not desensitize the recycling control circuit. In order to remove the charge on the condenser 260 so as not to desensitize the control circuit at any time except when a response occurs in the wave signal receiver 10 the contacts 202b of the recycling control relay 202 are adapted momentarily to connect the condenser 260 across the inductance of the winding 193' whenever the recycling control relay 202 is energized. It will be apparent that the arrangement for desensitizing the recycling control channel at the instant of logging and making the recycling control channel normally more sensitive than the 5 kc. channel is a safety provision to prevent incorrect operation of the system.

If the receiver attachment is not connected to the receiver 10, but a microphone is employed as in the above mentioned Scherbatskoy co-pending application, then it would also be undesirable to make a connection with the receiver 10 for obtaining a potential representative of the automatic volume control voltage. Under these conditions the low frequency amplifier 34a might be energized in response to a signal produced when the tuning of the wave signal receiver 10 is changed. For example, the tuning control or the push buttons of a receiver might be provided with a permanent magnet movable therewith. Associated with the permanent magnet could be a small stationary coil connected to the control electrode of the low frequency amplifier 234a. Movement of the tuning control and consequently of the permanent magnet would induce a current in the adjacent stationary coil to initiate the recycling device in the receiver attachment 13 and consequently cause an 8 kc. oscillation to be produced by the oscillator 240.

In view of the detailed description included above the operation of the lock out device and automatic recycling control described above will be apparent and no further discussion thereof is included herein. Due to the lock out control and recycling feature of the present invention it is not essential that the search tone be inaudible since it occurs only at the instant of tuning a receiver to a station and then does not again occur until a new station is tuned in.

In the arrangement described above the lock out arrangement silences the search signal generator on all channels once a response is received on any channel. In Figs. 4a and 4b of the drawings there is disclosed an arrangement in which lock out occurs on the channel tuned in by the wave signal receiver and the search signal is sent out on all other channels. Whenever one of the other channels shows a response, release of lock out is obtained. The corresponding parts of Figs. 4a and 4b of the drawings are designated by the same reference numerals as in the preceding figures.

Since the lock out is released in response to the production of a response in another channel, it is unnecessary to rely on a change in the AVC voltage of the receiver and the receiver attachment 13' is considerably simplified over that shown in Fig. 2a of the drawings since the integrating device 230, the amplifier 234a, the relay 238 and the 8 kc. oscillator 240 are not required.

The search signal generator 35 on the other hand is substantially identical with the search signal generator 35 shown in Fig. 2b of the drawings and certain portions thereof have been omitted to simplify the drawings. As in Fig. 2b of the drawings the synchronous motor 61 drives at one revolution per minute the rotating switch arms 45 and 56. However, the rotating switch 64 is no longer driven by the synchronous motor 61, but instead is driven by an independent synchronous motor 300 which is also capable of rotating its shaft 300' at one revolution per minute. The synchronous motor 61 on the other hand has its shaft 61' connected to rotate a rotatable switch arm 301 which is adapted to successively engage cooperating contacts 302a, 302b, 302c, 302d, 302e, 302f, 302g, 302h, 302i and 302j, which are arranged on the circumference of a circle in exactly the same manner as the contacts 44 with the contacts marked with the same subscript, being positioned so as to be simultaneously engaged by their respective switch arms 45 and 301. The switch arm 301 has been illustrated as of a somewhat different type than the switch arms 45 and 56 and it may be designated as of the so-called "shorting type," i. e. the arm 301 makes contact momentarily with two adjacent contacts when passing from one to the other whereas the switch arms 45 and 56 are adapted to engage only a single contact at a time.

The synchronous motor 61 is adapted to be continually energized through conductors 62 and 63 which are connected to the power supply unit 120 so that whenever the power supply unit 120 is energized from the power lines 14 the synchronous motor 61 causes a search signal of variable frequency to be applied to the antennas 15 and 82. As was mentioned above the synchronous motor 300 is adapted to be deenergized so as to control a suitable means for locking out a particular channel to which the wave signal receiver 10 is tuned.

For the purpose of relating the synchronous motor 61 to the synchronous motor 300 there is provided a rotating switch mechanism comprising a rotating switch arm 305 and associated contacts 306a, 306b, 306c, 306d, 306e, 306f, 306g, 306h, 306i, and 306j which are arranged in equally spaced relationship on the circumference of a circle in the same manner as the contacts 302. The rotary switch arm is further connected to the shaft 300' so as to be rotated in a counterclockwise direction as viewed in Fig. 4a of the drawings upon operation of the synchronous motor 300. The contacts 306 are arranged so that those contacts marked with corresponding subscripts are in identical positions with the corresponding contacts 302. Furthermore the contacts with corresponding subscripts are interconnected by suitable conductors as is clearly shown in Fig. 4a of the drawings. The rotatable switch arm 301 is connected to ground as illustrated while the rotatable switch arm 305 is connected by means of a conductor 307 through the winding 308' of a relay 308 to a source of +B potential indicated as the conductor 211. With this arrangement it is apparent that the relay 308 is energized whenever the switch arms 301 and 305 are disposed on their associated contacts marked with the same subscript. The switch arm 305 is furthermore illustrated as of the "shorting type" similar to the switch arm 301.

In order to perform suitable control operations the relay 308 is provided with two sets of normally open contacts 308a and 308b and two sets of normally closed contacts 308c and 308d. The normally open contacts 308a control the energizing circuit for the synchronous motor 300 which has one terminal thereof connected through the conductor 310 and the contacts 308a to the conductor 63 of the synchronous motor 61 which as was mentioned above is connected to the power supply unit 121. The other terminal of the synchronous motor 300 is directly connected to the conductor 62 which as was described above is also connected to the other terminal of the synchronous motor 61. It will be apparent that the synchronous motor 300 is energized whenever the relay 308 is actuated to close its contacts 308a. When, however, the relay 308 is in the position shown in Fig. 4b of the drawings the synchronous motor 300 is deenergized.

In order that the synchronous motor 300 may lock out only a single channel of the search signal generator 35 there is provided an additional rotating switch mechanism comprising the rotating arm 312 which is drivingly connected to the shaft 300'. The switch arm 312 is adapted to successively engage the contacts 313a, 313b, 313c, 313d, 313e, 313f, 313g, 313h, 313i, and 313j inclusive which are arranged in spaced relationship about the circumference of a circle in exactly the same manner as the contacts 44 so that those contacts with corresponding subscripts occupy identical positions with reference to their associated circular arrangement. As illustrated the rotating switch arm 312 is grounded through a conductor 314 and the normally closed contacts 308d of the relay 308. The contacts 313a to 313f inclusive are connected through a suitable cable 311 to the contacts 44a to 44f respectively. With this arrangement it is apparent that whatever contact is engaged by the rotating switch arm 312 the corresponding contact 44 is grounded when the contacts 308d of the relay 308 is closed, which effectively means that the control electrode 40 of the portion 35a of the search signal generator 35 is rendered ineffective to produce a search signal on a particular channel corresponding to the contact 313 engaged by the switch arm 312. The contacts 313g, 313h, and 313i are connected by suitable conductors 315g, 315h, and 315i respectively with the terminals 87g, 87h and 87i of the control electrodes 87 of the very high frequency oscillators 70. With this arrangement the particular oscillator 70 corresponding to the contact 313g, 313h, or 313i engaged by the switch arm 312 is rendered ineffective to produce a search signal when the relay 308 is deenergized.

The rotary switch mechanism comprising the rotating switch arm 64 and the contacts 65 forming a portion of the recorder 68 is identical in Fig. 4a with the recorder 68 of Fig. 2b. However, the rotating switch arm 64 is drivingly connected to the shaft 309' rather than the shaft 61'.

In view of the fact that the central station 15' of Figs. 4a and 4b need not receive an 8 kc. signal as was the case in Fig. 2c, the twin triode amplifier 189 is dispensed with and instead the output of the 5 kc. band pass filter 184 is connected to the control electrode of a triode 189a. The twin diode 190 and the twin triode 191 are retained however to provide two separate channels for passing responses occurring by virtue of the wave signal receiver 10 being tuned to different channels. The corresponding parts are identical in general with those shown in the preceding figures and are designated by the same reference numerals. The relay 193 differs only in that one set of contacts 193c has been omitted. Similarly the relay having the winding 202' differs from that shown in Fig. 2c in that the set of contacts 202b has been omitted. Also the resistor 195, the capacitor 199 and the resistor 197 are designed to have a much longer time constant than in the preceding figures, whereupon the contact arm 301 is capable of moving from one contact to another in the time it takes to build up a positive bias on the resistor 197. It will be understood that the resistors 195 and 197 and the capacitor 199 as well as the resistors 250 and 251 and the capacitor 253 provide time constant or integrating circuits which prevent noise or surges from being transmitted.

In accordance with the present invention the coupling capacitor 194 is adapted alternately to connect the output of the amplifier 189a with either the rectifier 190a or the rectifier 190b through contacts 308b or 308c respectively. Consequently depending upon the position of the relay 308 the channel comprising the rectifier 190a and the direct current amplifier 191a or the channel comprising the rectifier 190b and the direct current amplifier 191b are rendered effective, the first mentioned channel being connected to the winding 193' of the relay 193 while the second mentioned channel is connected to the winding 202' of the corresponding relay 202.

For the purpose of maintaining the relay 193 energized once a search tone or response has been produced the contacts 193a thereof as in the preceding figures are adapted to control the supply of +B potential from the conductor 162 through a voltage dropping resistor 320 to the plate circuit of the rectifier 190a. Preferably the relay 193 is designed so that the current flow for causing operation thereof to close contacts 193a is three or four times greater than the value necessary to hold these contacts in the closed position. The potential applied through voltage dropping resistor 320 is only sufficient to hold the relay 193 in its closed position with reference to contacts 193a, and is substantially below the current pick up value thereof.

Assume for example that the central station 15' is deenergized and the synchronous motors 61 and 300 with their associated rotary switch mechanisms are in the positions shown. Upon tuning the wave signal receiver 10 to a particular channel the power supply unit 120 of the central station 15' is energized with the result that the synchronous motor 61 begins to rotate the switch arms 45, 56 and 301 in the direction of the arrows of Fig. 4a at one revolution per minute. Since the contacts 308a are open the synchronous motor 300 is not energized. A search signal is produced at this time by the search signal generator 35 on all channels except the one rendered ineffective by the particular position of the switch arm 312. As soon as the rotating switch arm 301 has rotated so as to assume the same position as that of the rotating switch arm 305 a circuit is completed through the relay winding 308' thereby closing the contacts 308a and energizing the synchronous motor 300 which continues to rotate in synchronism with the synchronous motor 61. The rotating switch mechanism comprising the rotating arm 64 operates in exactly the same manner as in the preceding figures with reference to the "all other stations" stylus 67j and the like. The synchronous motors 61 and 300 continue to rotate in synchronism as long as the relays 193 and 202 remain in the position shown in the Fig. 4b. Also when relay 308 is energized the search signal is effective on all channels represented. Upon the occurrence of a search tone a response is produced which is received at the central station 15'. Since the relay 308 is energized the contacts 308b are closed and the contacts 308c are open. The response therefore is transmitted to the channel comprising the rectifier 190a so as to energize the relay 193 which closes its contacts 193a and opens its contacts 193b. Opening of the contacts 193b immediately deenergizes the relay 308 so as to open its contacts 308a to deenergize the synchronous motor 300. At this time the contact arm 312 will ground the particular channel of the search signal generator 35 corresponding to the channel to which the wave signal receiver 10 is tuned through the conductor 314 and the contacts 308d of the relay 308. The search signal generator will therefore continue to produce a search signal on all channels except the particular one to which the wave signal receiver is tuned and effectively therefore the single channel to which the receiver 10 is tuned is locked out and all the other channels are effective as far as the search signal is concerned.

It will be understood that the deenergization of the relay 308 will also cause contacts 308c to close so as to connect the channel comprising the rectifier 190b with the output of the amplifier 189a. The relay 193 due to the long time constant produced by the circuit comprising the resistor 195 and the capacitor 199 remains energized even though the response may produce momentarily energization of the relay 202. Immediately thereafter the relay 202 closes its contacts 202a so that +B potential is restored and the relay 193 remains latched in by virtue of the +B potential supplied through the contacts 193a and the resistor 320 to the plate circuit of the rectifier 190a. The proper stylus 67 is energized to produce a trace on the recording element 215 indicative of the particular tuning condition of the wave signal receiver 10.

Since the search signal output from generator 35 continues to be produced on all channels except the one to which the wave signal receiver 10 is tuned the occurrence of a response in another channel indicates a change in tuning of a wave signal receiver. This response due to the closed condition of the contacts 308c is supplied to the channel comprising the rectifier 190b with the resultant energization of the relay 202 to open its contacts 202a and interrupt the energization circuit of the relay 193. When the rotating switch arm 301 again assumes the same position as the rotating switch arm 305 the relay 308 is reenergized to cause operation of the synchronous motor 300 in synchronism with the motor 61 until the occurrence of a subsequent response causes the motor 300 to stop at the appropriate place representative of the channel to which the wave signal receiver 10 is tuned.

In the arrangements described above a search signal generator is illustrated which produces a discontinuously varying frequency rather than a continuously varying frequency. It should be understood that a continuously varying frequency of the search signal generator might equally well be employed as is shown for example in co-pending Scherbatskoy application, Serial No. 781,988 referred to above.

In the arrangement of a discontinuously variable frequency search signal disclosed in Figs. 4a and 4b it will be apparent that the collaborator might retune the wave signal receiver 10 to a station for which no specific search signal channel is provided and the recorder 68 would indicate that the wave signal receiver 10 continued to be tuned to the same setting as the preceding tuning condition. Although this would introduce a negligible error, this error might be further reduced by the provision of a switch 321 which could be driven so as to interrupt the +B circuit periodically every five or ten minutes and cause recycling of the lock out device. If upon opening the switch 321 the wave signal receiver were tuned to a channel for which no corresponding channel is provided in the search signal generator 35 then the synchronous motors 61 and 300 would continue to rotate in synchronism until the receiver 10 was retuned to a channel for which a corresponding channel is provided in the search signal generator 35.

It will be apparent to those skilled in the art that the present invention is not limited to the particular constructions and arrangements shown and described, but that changes and modifications may be made without departing from the spirit and scope of the invention, and it is aimed in the appended claims to cover all such changes and modifications.

What is claimed as new and desired to be secured by Letters Patent of the United States is:

1. In a device for determining the listening habits of users of a wave signal receiver capable of being tuned to any one of a plurality of radiated carriers from transmitters disposed within the reception range of said receiver comprising a generator separate from said receiver for cyclically generating a search signal varying in frequency throughout said search cycle, means for intermodulating said search signal with a signal whose frequency is related in a predetermined manner to the frequency of the one of said radiated carriers tuned in by said receiver whereby a response is produced due to such intermodulation, the instant of occurrence of said response during said cycle being indicative of the particular transmitter to which said wave signal receiver is tuned, and means responsive to the occurrence of said response for interrupting the operation of said generator shortly after said receiver is tuned to receive a particular one of said radiated carriers.

2. In a device for determining the listening habits of users of a wave signal receiver capable of being tuned to any one of a plurality of radiated carriers from transmitters disposed within the reception range of said receiver comprising a generator separate and remote from said receiver for cyclically generating a search signal, means in said generator for controlling the same to produce each cycle of said search signal as a signal variable in frequency in a stepwise fashion, each step having a frequency related in a predetermined manner to the frequency of a corresponding one of said radiated carriers capable of being tuned in by said wave signal receiver, means for intermodulating said search signal with a signal related in a predetermined manner to the frequency of the one of said radiated carriers tuned in by said receiver whereby a recordable response is produced due to such intermodulation, the instant of occurrence of said response during said cycle being indicative of the particular radiated carrier tuned in by said wave signal receiver, and means responsive to the occurrence of said response for stopping the production of said search signal following the tuning of said receiver to receive a particular one of said radiated carriers.

3. In a device for determining the listening habits of users of a wave signal receiver capable of being tuned to any one of a plurality of radiated carriers from transmitters disposed within the reception range of said receiver comprising an oscillator separate from said receiver for cyclically generating a radio frequency signal variable in frequency in a predetermined stepwise fashion throughout each cycle, the frequency of each step of said radio frequency signal being related in the same predetermined manner to the transmitting frequency of a different one of a plurality of transmitting stations likely to be tuned in by said receiver, means operative in response to the tuning of said receiver to a predetermined one of said radiated carriers, and means responsive to said last-mentioned means for discontinuing the generation of said radio frequency signal following the tuning of said receiver to a particular station.

4. In a device for determining the listening habits of users of a wave signal receiver capable of being tuned to any one of a plurality of radiated carriers from transmitters disposed within the reception range of said receiver comprising means remote from said receiver for cyclically generating a search signal receivable by said receiver including means for causing each cycle of said search signal to comprise a signal variable in frequency in a predetermined manner throughout said cycle, means for controlling the spectral composition of said search signal to produce a search tone in said receiver at the instant during the search cycle that the frequency of said search signal bears a predetermined relationship to the frequency of the pass band to which said receiver is tuned, and means responsive to the occurrence of said search tone for interrupting the production of said search signal for the period that said receiver remains tuned to a particular pass band.

5. In a device for determining the listening habits of users of a wave signal receiver capable of being tuned to any one of a plurality of radiated carriers from transmitters disposed within the reception range of said receiver comprising means apart from said receiver for cyclically generating a search signal reseivable by said receiver including means for causing each cycle of said search signal to comprise a signal variable in frequency in a predetermined manner throughout said cycle, means for controlling the spectral composition of said search signal to produce a search tone at the instant during the search cycle that the frequency of said search signal bears a predetermined relationship to the transmitting frequency of the transmitter to which said receiver is tuned, means responsive to the occurrence of said search tone for interrupting the production of said search signal for the period that said receiver remains tuned to a particular transmitter, and means responsive to a change in tuning of said receiver for causing said first mentioned means to generate said search signal.

6. In a device for determining the listening habits of users of a wave signal receiver capable of being tuned to receive any one of a plurality of carriers radiated from transmitters disposed within the reception range of said receiver comprising generator means remote from said receiver for cyclically generating in a series of successive cycles a signal which scans a predetermined frequency spectrum once each cycle, response producing means responsive to the reception of said signal for producing once during each cycle a predetermined response when said receiver is tuned to a particular pass band, means responsive to the occurrence of said response for discontinuing the production of said cyclically generated signal shortly after said receiver is tuned to a particular pass band and remains so tuned, and means for again cyclically producing said signal upon a change in tuning of said receiver.

7. In a device for determining the listening habits of users of a wave signal receiver capable of being tuned to any one of a plurality of radiated carriers from transmitters disposed within the reception range of said receiver comprising a generator apart from said receiver for cyclically generating in a series of successive cycles a search signal varying in frequency throughout said search cycle, means for intermodulating said search signal with a signal related in a predetermined manner to the transmitting frequency of a transmitter tuned in by said receiver whereby a response is produced due to such intermodulation, the instant of occurrence of said response during said cycle being indicative of the particular transmitter to which said wave signal receiver is tuned, and means responsive to the occurrence of said response for discontinuing the production of said search signal.

8. In a device for determining the listening habits of users of a wave signal receiver capable of being tuned to any one of a plurality of radiated carriers from transmitters disposed within the reception range of said receiver comprising a generator remote from said receiver for cyclically generating a search signal varying in frequency throughout said search cycle, means for intermodulating said search signal with a signal related in a predetermined manner to the transmitting frequency of a transmitter tuned in by said receiver whereby a response is produced due to such intermodulation, the instant of occurrence of said response during said cycle being indicative of the particular transmitter to which said wave signal receiver is tuned, means responsive to the occurrence of said response for discontinuing the production of said search signal by locking out said generator and means for recycling said generator in response to the occurrence of certain predetermined conditions.

9. In a device for determining the listening habits of users of a wave signal receiver capable of being tuned to any one of a plurality of radiated carriers from transmitters disposed within the reception range of said receiver comprising a generator separate from said receiver for cyclically generating in a series of successive search cycles a search signal varying in frequency throughout said search cycle, means for intermodulating said search signal with a signal related in a predetermined manner to the frequency of one of such radiated carriers tuned in by said receiver whereby a response is produced due to such intermodulation at the instant the intermodulated signals have a certain frequency relationship, the instant of occurrence of said response during said cycle being indicative of the particular transmitter to which said wave signal receiver is tuned, means responsive to the occurrence of said response for interrupting the production of said search signal by locking out said generator, means for recycling said generator in response to the occurrence of certain predetermined conditions, said last mentioned means being more sensitive than said means for interrupting the production of said search signal whereby a false response causing inadvertent lock out will also cause recycling.

10. In a device for determining the listening habits of users of a wave signal receiver capable of being tuned to any one of a plurality of radiated carriers from transmitters disposed within the reception range of said receiver comprising generating means apart from said receiver for cyclically generating in a series of successive cycles a signal which scans a predetermined frequency spectrum once each cycle, response producing means responsive to the reception of said signal for producing once during each cycle the same predetermined response when said receiver is tuned to a particular pass band, and means responsive to the occurrence of said response for discontinuing the production of said cyclically generated signal shortly after said receiver is tuned to said particular pass band.

11. In a device for determining the listening habits of users of a wave signal receiver capable of being tuned to any one of a plurality of radiated carriers from transmitters disposed within the reception range of said receiver comprising generating mean apart from said receiver for cyclically generating a signal which scans a predetermined frequency spectrum once each cycle in a series of successive cycles, response producing means responsive to the reception of said signal for producing once during each cycle a predetermined response when said receiver is tuned to a particular pass band, means responsive to the occurrence of said response for discontinuing the production of said cyclically generated signal shortly after said receiver is tuned to a particular pass band, and means responsive to a change in tuning of said receiver for restarting said first mentioned means.

12. In a device for determining the listening habits of users of a wave signal receiver capable of being tuned to any one of a plurality of radiated carriers from transmitters disposed within the reception range of said receiver comprising generating means remote from said receiver for generating a signal which scans a predetermined frequency spectrum in a series of successive cycles, response producing means responsive to the reception of said signal for producing a predetermined response when said receiver is tuned to a particular pass band, means responsive to the occurrence of said predetermined response for discontinuing the production of said generated signal shortly after said receiver is tuned to a particular pass band, and means responsive to a change in the automatic volume control voltage of said receiver for restarting said first mentioned means.

13. In a device for determining the listening habits of users of a wave signal receiver capable of being tuned to any one of a plurality of radiated carriers from transmitters disposed within the reception range of said receiver comprising generating means separate from said receiver for cyclically generating a signal which scans a predetermined frequency spectrum once each cycle in a series of successive cycles, response producing means responsive to the reception of said signal for producing once during each cycle a predetermined response when said receiver is tuned to a particular pass band, means responsive to the occurrence of said predetermined response for discontinuing the production of said cyclically generated signal shortly after said receiver is tuned to a particular transmitter, and means responsive to movement of the tuning knob of said receiver for restarting said first mentioned means.

14. In a device for determining the listening habits of users of a wave signal receiver comprising a central station disposed remotely from said receiver and connected thereto solely by a common power supply line, means for energizing said central station from said power supply line in response to the turning on of said receiver, a search signal generator in said central station for cyclically generating a variable frequency search signal receivable by said receiver and capable of producing a response in said receiver at a predetermined instant during each cycle when said receiver is tuned to a predetermined pass band, a receiver attachment associated with said receiver for receiving said response and transmitting a signal representative thereof to said central station for the purpose of recording the same, relay means at said central station for interrupting the operation of said search signal generator following the receipt of said signal representative of said response, seal-in means for maintaining said relay means energized once said signal representative of said response is received, means in said receiver attachment for momentarily producing high frequency oscillations above the audible range of said receiver in response to a change in tuning of said receiver, and means at said central station responsive to the receipt of said high frequency oscillations for rendering said seal-in means ineffective, thereby to cause recycling of said search signal generator.

15. In a device for determining the listening habits of users of a wave signal receiver comprising a central station disposed remotely from said receiver and connected thereto solely by a common power supply line, means for energizing said central station from said power supply line in response to the turning on of said receiver, a search signal generator in said central station for cyclically generating a variable frequency search signal receivable by said receiver and capable of producing a response in said receiver at a predetermined instant during each cycle when said receiver is tuned to a predetermined pass band, a receiver attachment associated with said receiver for receiving said response and transmitting a signal representative thereof to said central station for the purpose of recording the same, relay means at said central station for interrupting the operation of said search signal generator following the receipt of said signal representative of said response, seal-in means for maintaining said relay means energized once said signal representative of said response is received, means in said receiver attachment for momentarily producing high frequency oscillations above the audible range of said receiver in response to a change in the automatic gain control voltage of said receiver, and means at said central station responsive to the receipt of said high frequency oscillations for rendering said seal-in means ineffective, thereby to cause recycling of said search signal generator.

16. In a device for determining the listening habits of users of a wave signal receiver comprising a central station disposed remotely from said receiver and connected thereto solely by a common power supply line, means for energizing said central station from said power supply line in response to the turning on of said receiver, a search signal generator in said central station for cyclically generating a variable frequency search signal receivable by said receiver and capable of producing a response in said receiver at a predetermined instant during each cycle when said receiver is tuned to a predetermined transmitting station, a receiver attachment associated with said receiver for receiving said response and transmitting a signal representative thereof to said central station for the purpose of recording the same, a first channel at said central station for passing said signal representative of said response including relay means for controlling a recording device, contacts controlled by said relay means for interrupting the operation of said search signal generator following the receipt of said signal representative of said response, seal-in means for maintaining said relay means energized once said signal representative of said response is received, means in said receiver attachment for momentarily producing high frequency oscillations above the audible range of said receiver in response to a change in tuning of said receiver, and a second channel at said central station for passing said high frequency oscillations including means for rendering said seal-in means ineffective, thereby to cause recycling of said search signal generator.

17. A search signal device for determining the listening habits of users of a wave signal receiver comprising a central station disposed remotely from said receiver and connected thereto solely by a common power supply line, means for energizing said central station from said power supply line in response to the turning on of said receiver, a search signal generator in said central station for cyclically generating a variable frequency search signal receivable by said receiver and capable of producing a 5 kc. response in said receiver at a predetermined instant during each cycle when said receiver is tuned to a predetermined transmitting station, a receiver attachment associated with said receiver for receiving said 5 kc. response and transmitting a signal representative thereof to said center station for the purpose of recording the same, relay means at said central station for interrupting the operation of said search signal generator following the receipt of said signal representative of said 5 kc. response, seal-in means for maintaining said relay means energized once said signal representative of said 5 kc. response is received, means in said receiver attachment for momentarily producing an 8 kc. oscillation in response to a change in tuning of said receiver, and means at said central station responsive to the receipt of said 8 kc. oscillation for rendering said seal-in means ineffective, whereby recycling of said search signal generator to produce said search signal occurs.

18. In a device for determining the listening habits of users of a wave signal receiver comprising a central station disposed remotely from said receiver and connected thereto solely by a common power supply line, means for energizing said central station from said power supply line in response to the turning on of said receiver, a search signal generator in said central station for cyclically generating a variable frequency search signal receivable by said receiver and capable of producing a response in said receiver at a predetermined instant during each cycle when said receiver is tuned to a predetermined transmitting station, a receiver attachment associated with said receiver for receiving said response and transmitting a signal representative thereof to said central station for the purpose of recording the same, relay means at said central station for interrupting the operation of said search signal generator following the receipt of said signal representative of said response, seal-in means for maintaining said relay means energized once said signal representative of said response is received, means in said receiver attachment for momentarily producing high frequency oscillations above the audible range of said receiver in response to a change in tuning of said receiver, means at said central station responsive to the receipt of said high frequency oscillations for rendering said seal-in means ineffective, and means for desensitizing said last mentioned means at the instant a response occurs in said receiver to prevent inadvertent recycling of said search signal generator.

19. In a device for determining the listening habits of users of a wave signal receiver comprising a central station disposed remotely from said receiver and connected thereto solely by a common power supply line, means for energizing said central station from said power supply line in response to the turning on of said receiver, a search signal generator in said central station for cyclically generating a variable frequency search signal receivable by said receiver and capable of producing a response in said receiver at a predetermined instant during each cycle when said receiver is tuned to a predetermined transmitting station, a receiver attachment associated with said receiver for receiving said response and transmitting a signal representative thereof to said central station for the purpose of recording the same, a first channel at said central station for passing said signal representative of said response including relay means for controlling a recording device, contacts controlled by said relay means for interrupting the operation of said search signal generator following the receipt of said signal representative of said response, seal-in means for maintaining said relay means energized once said signal representative of said response is received, means in said receiver attachment for momentarily producing high frequency oscillations above the audible range of said receiver in response to a change in tuning of said receiver, and a second channel at said central station for passing said high frequency oscillations including means for rendering said seal-in means ineffective, thereby to cause recycling of said search signal generator, said second channel being more sensitive than said first channel whereby a disturbance causing false operation of the means associated with said first channel also causes operation of the means associated with said second channel.

20. In a device for determining the listening habits of users of a wave signal receiver capable of being tuned to any one of a plurality of radiated carriers from transmitters disposed within the reception range of said receiver comprising means remote from said receiver for cyclically generating a search signal receivable by said receiver including means for causing each cycle of said search signal to comprise a signal variable in frequency in a predetermined manner throughout said cycle, means for controlling the spectral composition of said search signal to produce a monochromatic search tone due to detection of said search signal in said receiver at the instant during the search cycle that the frequency of said search signal bears a predetermined relationship to the transmitting frequency of the transmitter to which said receiver is tuned, means responsive to the production of said search tone for discontinuing the generation of a search signal whereby the audibility of said search tone is immaterial, and means for momentarily producing a monochromatic signal in response to a change in tuning of said receiver for recycling said means for generating said search signal.

21. In a device for determining the listening habits of users of a wave signal receiver capable of being tuned to any one of a plurality of radiated carriers from transmitters disposed within the reception range of said receiver of the type having automatic gain control means and manual volume control means, comprising means apart from said receiver for cyclically generating a signal which scans a predetermined frequency spectrum once each cycle, means responsive to said signal for producing once during each cycle a predetermined response when said receiver is tuned to a particular pass band, means responsive to the occurrence of said response for discontinuing the production of said cyclically generated signal shortly after said receiver is tuned to a particular transmitter, means connected to the top of said automatic volume control means and including an integrator circuit for producing a signal representative of the voltage of said automatic gain control means, and means responsive to a change in said voltage for causing recycling of said means for generating a search signal.

22. In a device for determining the listening habits of users of a wave signal receiver capable of being tuned to any one of a plurality of radiated carriers from transmitters disposed within the reception range of said receiver comprising means remote from said receiver for cyclically generating a signal which scans a predetermined frequency spectrum once each cycle, means responsive to the occurrence of said signal for producing once during each cycle a predetermined response when said receiver is tuned to a particular pass band, and means responsive to the occurrence of said response for discontinuing the production of only that portion of said cyclically generated signal which causes said response shortly after the occurrence of said response.

23. In a device for determining the listening habits of users of a wave signal receiver capable of being tuned to any one of a plurality of radiated carriers from transmitters disposed within the reception range of said receiver comprising means separate from said receiver for cyclically generating a signal which scans a predetermined frequency spectrum once each cycle, means responsive to the occurrence of said signal for producing once during each cycle a predetermined response when said receiver is tuned to a particular pass band, means responsive to the occurrence of said response for discontinuing the production of only that portion of said cyclically generated signal which causes the response when said receiver is tuned to said particular pass band immediately after said receiver is tuned to said pass band, and means responsive to the subsequent occurrence of a response in said receiver by virtue of the remaining portion of the cyclically generated signal for restarting the production of that portion of the search signal which was discontinued.

24. In a device for determining the listening habits of users of a wave signal receiver capable of being tuned to any one of a plurality of radiated carriers from transmitters disposed within the reception range of said receiver comprising means remote from said receiver for cyclically generating a search signal which scans a predetermined frequency spectrum once each cycle, means for causing said search signal to tend to produce a response in said receiver during each cycle at the instant that the frequency of said search signal bears a predetermined relationship to the frequency of a particular pass band tuned in by said receiver, means responsive to the occurrence of said response for rendering said first mentioned means ineffective to produce a response for more than one or two cycles after said receiver is tuned to a particular pass band, and means responsive to a change in tuning of said receiver for again rendering said first mentioned means effective.

25. In a device for determining the listening habits of users of a wave signal receiver capable of being tuned to any one of a plurality of radiated carriers from transmitters disposed within the reception range of said receiver comprising means apart from said receiver for cyclically generating a search signal which scans a predetermined frequency spectrum once each cycle, means for causing said search signal to tend to produce a response in said receiver during each cycle at the instant that the frequency of said search signal bears a predetermined relationship to the frequency of a particular channel tuned in by said receiver, means responsive to the occurrence of said response for rendering said first mentioned means ineffective for an instant during the search signal cycle when a response would occur after the receiver has been tuned to said channel for more than one or two cycles, and means responsive to the subsequent occurrence of a response in said receiver indicating a change in tuning thereof for permitting said search signal to be produced throughout said cycle.

26. In a device for determining the listening habits of users of a wave signal receiver capable of being tuned to any one of a plurality of radiated carriers from transmitters disposed within the reception range of said receiver comprising means separate from said receiver for cyclically generating a search signal which scans a predetermined frequency spectrum once each cycle, means for causing said search signal to tend to produce a response in said receiver during each cycle at the instant that the frequency of said search signal bears a predetermined relationship to the frequency of a particular channel tuned in by said receiver, means responsive to the occurrence of said response for locking out said first mentioned means for the instant during each cycle that a response would be produced in said receiver when tuned to said particular channel but permitting the search signal corresponding to other channels to be produced, and means responsive to the occurrence of a response following the lock out operation for permitting said search signal to be produced throughout the search cycle until said receiver is tuned to another channel.

27. In a device for determining the listening habits of users of a wave signal receiver comprising a central station disposed remotely from said receiver and connected thereto solely by a common power supply line, means for energizing said central station from said power supply line in response to the turning on of said receiver, a search signal generator in said central station for cyclically generating a variable frequency search signal receivable by said receiver and capable of producing a response in said receiver at a predetermined instant during each cycle when said receiver is tuned to a predetermined channel, a receiver attachment associated with said receiver for receiving said response and transmitting a signal representative thereof to said central station for the purpose of recording the same, relay means at said central station for effecting the operation of said search signal generator following the receipt of said signal representative of said response for preventing further occurrence of said response, seal-in means for maintaining said relay means energized once said signal representative of said response is received, the signal produced by said search signal generator after operation of said relay means being capable of producing responses in said receiver when said receiver is tuned to channels other than said predetermined channel and means at said central station responsive to the receipt of a signal representative of the occurrence of a subsequent response in said receiver indicative of a change in tuning of said receiver for rendering said seal-in ineffective.

28. In a device for determining the listening habits of users of a wave signal receiver capable of being tuned to any one of a plurality of radiated carriers from transmitters disposed within the reception range of said receiver comprising signal modifying means for cyclically modifying the radiated carrier received by said receiver whereby a response is produced in said receiver due to such signal modification, the instant of occurrence of said response during the cycle of operation of said signal modifying means being indicative of the particular transmitter to which said wave signal receiver is tuned, and means responsive to the occurrence of said response for discontinuing the operation of said signal modifying means.

29. In a device for determining the listening habits of users of a wave signal receiver capable of being tuned to any one of a plurality of radiated carriers from transmitters disposed within the reception range of said receiver comprising signal modifying means for cyclically modifying the radiated carrier received by said receiver whereby a response is produced in said receiver due to such signal modification, the instant of occurrence of said response during the cycle of operation of said signal modifying means being indicative of the particular transmitter to which said wave signal receiver is tuned, means responsive to the occurrence of said response for discontinuing the operation of said signal modifying means, and means for restarting the operation of said signal modifying means in response to retuning of said receiver.

30. In a system for determining and recording the listening habits of wave signal receiver users comprising means responsive to a characteristic of the incoming signal to said receiver when tuned to a particular radiated carrier for repetitively producing a characteristic response in said receiver thereby to determine the tuning condition of said receiver, said repetitive characteristic being such as to render a disturbance with respect to signal reproduction of said receiver, and means for eliminating said disturbance immediately after determining the particular radiated carrier to which said wave signal receiver is tuned.

SERGE A. SCHERBATSKOY.
ROBERT L. FREEMAN.

References Cited in the file of this patent

UNITED STATES PATENTS

| Number | Name | Date |
| --- | --- | --- |
| 2,231,806 | Goldsborough | Feb. 11, 1941 |
| 2,275,460 | Page | Mar. 10, 1942 |
| 2,283,523 | White | May 19, 1942 |
| 2,287,925 | White | June 30, 1942 |
| 2,326,737 | Andrews | Aug. 17, 1943 |
| 2,444,151 | Bliss | June 29, 1948 |